United States Patent
Chan et al.

(10) Patent No.: US 9,654,329 B2
(45) Date of Patent: May 16, 2017

(54) CONTENT DISTRIBUTION OVER A NETWORK

(71) Applicant: The Hong Kong University of Science and Technology, Kowloon (HK)

(72) Inventors: Shueng Han Gary Chan, New Territories (HK); Dongni Ren, Kowloon (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 211 days.

(21) Appl. No.: 13/887,040

(22) Filed: May 3, 2013

(65) Prior Publication Data

US 2013/0297731 A1    Nov. 7, 2013

Related U.S. Application Data

(60) Provisional application No. 61/687,940, filed on May 4, 2012.

(51) Int. Cl.
| | |
|---|---|
| *G06F 15/16* | (2006.01) |
| *H04L 29/06* | (2006.01) |
| *H04L 12/18* | (2006.01) |
| *H04L 12/24* | (2006.01) |
| *H04L 29/08* | (2006.01) |
| *H04L 12/875* | (2013.01) |

(Continued)

(52) U.S. Cl.
CPC ........ *H04L 29/06448* (2013.01); *H04L 12/18* (2013.01); *H04L 41/0896* (2013.01); *H04L 47/56* (2013.01); *H04L 65/00* (2013.01); *H04L 65/4084* (2013.01); *H04L 67/1031* (2013.01); *H04L 43/0864* (2013.01); *H04L 43/0888* (2013.01); *H04N 21/64723* (2013.01)

(58) Field of Classification Search
CPC ... H04L 29/06448; H04L 15/16; H04L 45/48; H04L 45/00; G06F 17/30516
See application file for complete search history.

(56) References Cited

U.S. PATENT DOCUMENTS

| | | | |
|---|---|---|---|
| 6,445,707 B1 * | 9/2002 | Iuoras | H04L 12/5602 370/395.43 |
| 7,054,935 B2 | 5/2006 | Farber et al. | |

(Continued)

OTHER PUBLICATIONS

Zhou, et al., "A Simple Model for Chunk-Scheduling Strategies in P2P Streaming". IEEE/ACM Transactions on Networking, vol. 19, No. 1, Feb. 2011; 1063-6692/$26.00(c)IEEE. Retrieved on May 9, 2012, 13 pages.

(Continued)

*Primary Examiner* — Liangche A Wang
*Assistant Examiner* — Ayele Woldemariam
(74) *Attorney, Agent, or Firm* — Amin, Turocy & Watson, LLP

(57) ABSTRACT

Distributive content delivery techniques are applied in a content delivery system. A content delivery overlay is generated as a function of delay times, bandwidth requirements, and throughput of a network. Helpers are added to the content delivery network as a function of delay times, bandwidth requirements, and throughput. Further, content can be transmitted without exchanging buffermaps or waiting for whole packets to be transmitted.

24 Claims, 17 Drawing Sheets

(51) Int. Cl.
*H04L 12/26* (2006.01)
*H04N 21/647* (2011.01)

(56) References Cited

U.S. PATENT DOCUMENTS

| | | | |
|---|---|---|---|
| 8,015,311 B2 | 9/2011 | Liu | |
| 2005/0015511 A1* | 1/2005 | Izmailov | H04L 12/18 709/238 |
| 2005/0058149 A1* | 3/2005 | Howe | H04L 47/10 370/428 |
| 2006/0259607 A1* | 11/2006 | O'Neal et al. | 709/223 |
| 2008/0063003 A1* | 3/2008 | O'Neal | 370/408 |
| 2008/0239972 A1* | 10/2008 | Omar | 370/250 |
| 2009/0019174 A1 | 1/2009 | Ehn | |
| 2009/0198829 A1* | 8/2009 | Sengupta et al. | 709/233 |
| 2010/0085979 A1* | 4/2010 | Liu et al. | 370/408 |

OTHER PUBLICATIONS

Chang, et al., "Live Streaming Performance of the Zattoo Network". IMC'09, Nov. 4-6, 2009, Chicago, Illinois, USA; Copyright 2009 ACM 978-1-60558-770-7/09/11 . . . $10.00. Retrieved on May 9, 2012, 13 pages.

He, et al., "Solving Streaming Capacity Problems in P2P VoD Systems". IEEE Transactions on Circuits and Systems for Video Technology, vol. 20, No. 11, Nov. 2010; 1051-8215/$26.00 (c) IEEE. Retrieved on May 9, 2012, 5 pages.

Jiang, et al., "Global 1-Mbps Peer-Assisted Streaming: Fine-Grain Measurement of a Configurable Platform." IEEE Transactions on Multimedia, vol. 14, No. 5, Oct. 2012; 1520-9210/$31.00 (c) IEEE. Retrieved on Aug. 20, 2013, 13 pages.

W. Zhu, C. Luo, J. Wang, and S. Li, "Multimedia cloud computing: Directions and applications," Special Issue on Distributed Image Processing and Communications, IEEE Signal Processing Magazine, vol. 28, May 2011.

Chen et al., "Multipath routing for video delivery over bandwidth-limited networks," IEEE Journal on Selected Areas in Communications Special Issue on Design, Implementation and Analysis of Communication Protocols, vol. 22, No. 10, pp. 1920-1932, Dec. 2004. Retrieved on Sep. 19, 2013, 14 pages.

Sivasubramanian, et al., "Replication for web hosting systems," in ACM Computing Surveys (CSUR), vol. 36, Sep. 2004. Retrieved on Sep. 19, 2013, 51 pages.

Su, et al., "Drafting behind akannai: inferring network conditions based on CDN redirections," in IEEE/ACM Transactions on Networking (TON), vol. 17, 2009. Retrieved on Sep. 19, 2013, 14 pages.

Ren, et al., "On reducing mesh delay for peer-to-peer live streaming," in IEEE INFOCOM. Phoenix, Arizona: IEEE, Apr. 2008. Retrieved on Sep. 19, 2013, 9 pages.

X. Li, R. Zou, X. Zhao, and F. Yang "A grouping algorithm of helpers in peer-to-peer video-on-demand systems," in Proceedings of the 12th international conference on Advanced communication technology, ser. ICACT'10. Piscataway, NJ, USA: IEEE Press, 2010, pp. 497-501.

Wang, et al., "On the role of helpers in peer-to-peer file download systems: Design, analysis and simulation," in In IPTPS07, 2007. Retrieved on Sep. 19, 2013, 6 pages.

Chang, et al., "Live streaming with receiver-based peer-division multiplexing," IEEE/ACM Trans. Netw., vol. 19, No. 1, pp. 55-68, Feb. 2011.

Sengupta, et al., "Peer-to-peer streaming capacity," Information Theory, IEEE Transactions on, vol. 57, No. 8, pp. 5072-5087, Aug. 2011. Retrieved on Sep. 19, 2013, 16 pages.

Kontothanassis, et al., "A transport layer for live streaming in a content delivery network," Proceedings of the IEEE, vol. 92, No. 9, pp. 1408-1419, Sep. 2004. Retrieved on Sep. 19, 2013, 12 pages.

Nygren, et al., "The akamai network: a platform for high-performance internet applications," SIGOPS Oper. Syst. Rev., vol. 44, No. 3, pp. 2-19, Aug. 2010. Retrieved on Sep. 19, 2013, 18 pages.

Su, et al., "Thinning akamai," in Proceedings of the 8th ACM SIGCOMM conference on Internet measurement, ser. IMC '08. New York, NY, USA: ACM, 2008, pp. 29-42. Retrieved on Sep. 19, 2013, 13 pages.

M. Adler, R. K. Sitaraman, and H. Venkataramani, "Algorithms for optimizing the bandwidth cost of content delivery," Comput. Netw., vol. 55, No. 18, pp. 4007-4020, Dec. 2011.

Jiang et al., "Proxy-P2P streaming under the microscope: Fine-grain measurement of a configurable platform," in Proceedings of the 19th International Conference on Computer Communications and Networks (ICCCN) (Invited paper), Aug. 2-5, 2010. Retrieved on Sep. 19, 2013, 6 pages.

Padhye, et al., "Modeling tcp throughput: a simple model and its empirical validation," SIGCOMM Comput. Commun. Rev., vol. 28, No. 4, pp. 303-314, Oct. 1998. [Online]. Available: http://doi.acm.org/10.1145/285243.285291 [20] B. Wang, J. Kurose, P. Shenoy, and D. Towsley, "Multimedia streaming via TCP: An analytic performance study," ACM Trans. Multimedia Comput. Commun. Appl., vol. 4, No. 2, pp. 16:1-16:22, May 2008. Retrieved on Sep. 19, 2013, 12 pages Wang, et al., "Multimedia streaming via TCP: An analytic performance study," ACM Trans. Multimedia Comput. Commun. Appl., vol. 4, No. 2, pp. 16:1-16:22, May 2008. Retrieved on Sep. 19, 2013, 8 pages.

Kuschnig, et al., "An evaluation of tcp-based rate-control algorithms for adaptive internet streaming of h.264/svc," in Proceedings of the first annual ACM SIGMM conference on Multimedia systems, ser. MMSys '10. New York, NY, USA: ACM, 2010, pp. 157-168. Retrieved on Sep. 19, 2013, 12 pages.

Krishnan, et al., "Moving beyond end-to-end path information to optimize CDN performance," in Proceedings of the 9th ACM SIGCOMM conference on Internet measurement conference, ser. IMC '09. New York, NY, USA: ACM, 2009, pp. 190-201. Retrieved on Sep. 19, 2013, 12 pages.

\* cited by examiner

CONTENT DISTRIBUTION OVER A NETWORK

CROSS-REFERENCE TO RELATED APPLICATIONS

This application claims priority to U.S. Provisional Application No. 61/687,940, filed May 4, 2012, and entitled "ACHIEVING HIGH-BITRATE OVERLAY LIVE STREAMING WITH PROXY HELPERS", the entirety of which is expressly incorporated herein by reference.

TECHNICAL FIELD

This disclosure generally relates to content distribution and streaming.

BACKGROUND

With the advances and proliferation of communication technologies, content sharing has become commonplace. Particularly, video sharing and video on demand (VoD) services have experienced increasing demand and have seen tremendous growth in popularity.

Content delivery networks or content distribution networks (CDNs) comprise servers located across the Internet that share content provided by a content provider. CDN providers provide infrastructure (e.g., a network of servers) to content providers to enable delivery of content over a network. Proxies or proxy servers typically cache content, and then fulfill successive requests for the same content, eliminating repetitive transmission of identical content over the network. End users comprise users that use personal computers or communication devices such as smart phones to access content over a CDN.

In the context of CDNs, content delivery describes an action of delivering content over a network in response to end user requests. The term 'content' refers to any kind of data, in any form, regardless of its representation and regardless of what it represents. Content generally includes both encoded media and metadata. Encoded content may include, without limitation, static, dynamic or continuous media, including streamed audio, streamed video, web pages, computer programs, documents, files, and the like. Some content may be embedded in other content, e.g., using markup languages such as HTML (Hyper Text Markup Language) and XML (Extensible Markup Language). Metadata comprises a content description that may allow identification, discovery, management and interpretation of encoded content.

The above-described background is merely intended to provide contextual overview of content distribution in a network, and is not intended to be exhaustive. Additional context may become apparent upon review of one or more of the various non-limiting embodiments of the following detailed description.

BRIEF DESCRIPTION OF THE DRAWINGS

Various non-limiting embodiments are further described with reference to the accompanying drawings.

DETAILED DESCRIPTION

Figure 1:
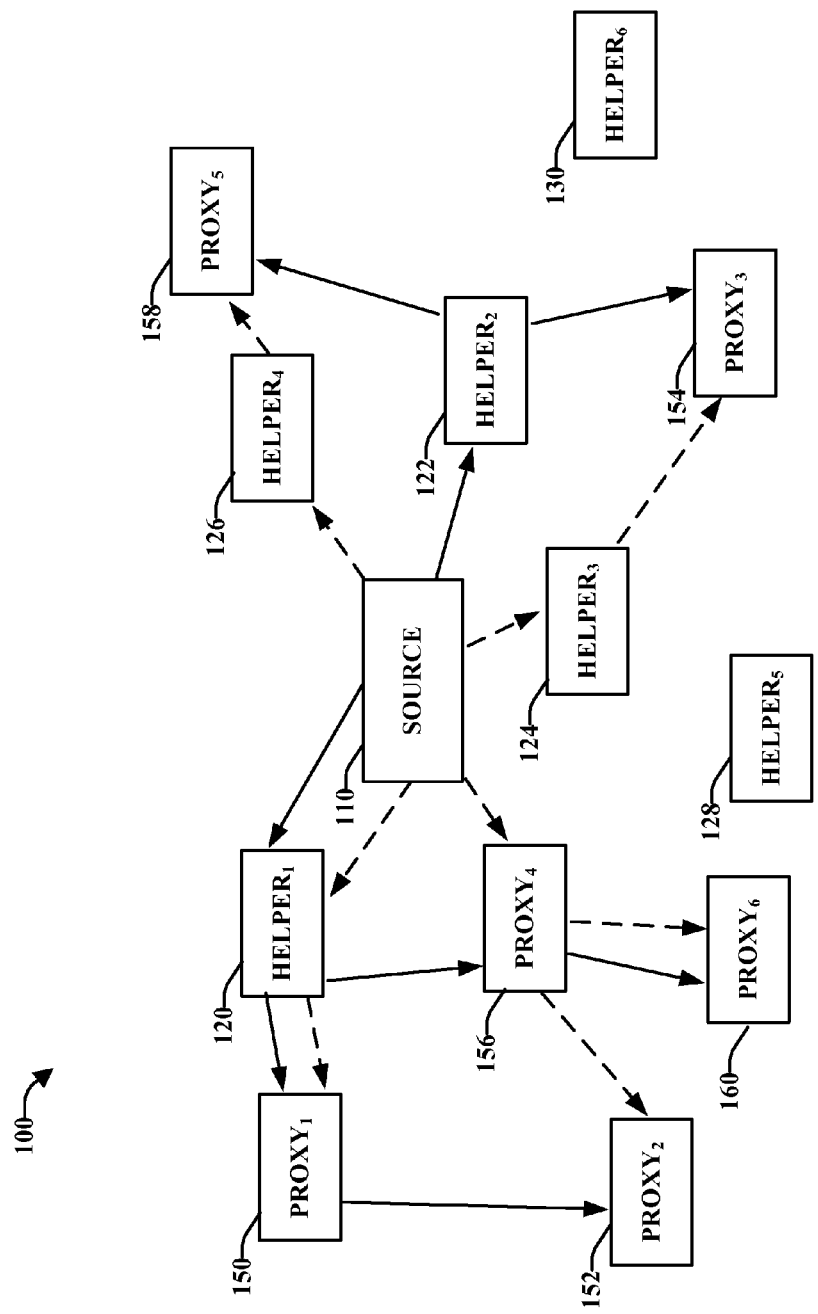
FIG. 1 illustrates a functional block diagram of a system for generation of a content delivery tree in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Various aspects disclosed herein relate to distribution of content in a network and construction of content delivery overlays. In an aspect, a communication system can generate distribution trees based on bandwidth and delay requirements. It is noted that bandwidth can refer to an amount of data transmitted (e.g., sent/received) over a period of time, such as bits per second. It is noted that delay can refer to a time needed to send data from a source to a destination, such as from a source server to a proxy server. In one aspect, scheduling delay can refer to a time elapsed from a parent node receiving data to the instant the data is transmitted to a child node. In another aspect, propagation delay can refer to the time elapsed while data travels from one node to a second node. As used herein, "worst-case delay" refers to the maximum time needed for data, e.g., a packet, to travel from a source to a server in a network.

In various implementations, a network is referred to as an overlay network. An overlay network can comprise a network built on top of an existing network, such as layered networks. As an example, live streaming networks are described as being overlay networks built on existing frameworks, such as the Internet. In an aspect, a content delivery tree can be an overlay network utilizing existing infrastructure, hardware, software, and the like.

A "proxy server", "proxy", "primary server", "proxy device", and the like can refer to a device that acts as an intermediary for requests sent from clients seeking content from other servers. As an example, a client connects to the proxy server, requesting some service, such as a content, connection, web page, or other resource available from a different server and the proxy server processes the request. Generally, proxy servers are deployed in locations with active users. In an aspect, a proxy can be geographically distant from a source server. An end-to-end throughput refers to the throughput from a source to an end node (e.g., user). As used herein, a "helper", "helper node", "secondary server", and the like refer to devices that can receive content and transmit content to other servers. Unless contexts suggests otherwise, a helper or secondary server does not directly connect to an end user device (e.g., a leaf node of a content delivery tree).

In a peer-to-peer (P2P) network, peers share content with each other. As an example, a P2P network can comprise a network of connected peers (e.g., end user devices). A peer can query the network for content, such as a video. Other peers can transmit the content in whole or in portions to the querying peer. In an aspect, peers with residual bandwidth can be employed to reduce server loads. In file sharing, peers can be added to accelerate a download rate of another peer. In another aspect, repeater devices can be added to a network. A repeater can receive and transmit videos to peers. P2P file-sharing and streaming usually referrers to transmission of static or stored content.

In various implementations, helper devices are utilized to meet delay and bit rate requirements, particularly in live streaming or time sensitive content delivery. As above, a helper can be a server that does not directly attach or communicate with end users. It is noted that additions of helps can provide rich path diversity, reduce scheduling delay, and increase system throughput and capacity. In an aspect, advantages of this disclosure are realized through selective introduction of helpers in content distribution trees to deliver streams and/or substreams of data. In another aspect, a helper can provide relief to overloaded or underperforming proxies, wherein overloaded or underperforming proxies are defined by determined metrics (e.g., bandwidth, delay, bottlenecks, etc). In an aspect, a bottleneck refers to a portion of a content delivery tree which experiences high delay and/or decrease in throughput relative to a target delay, target throughput, and/or performance of disparate proxies.

Referring now to the drawings, with reference initially to FIG. 1, presented is a system 100 that can facilitate generation of a content delivery network and streaming of content as a function of bandwidth, throughput, delay metrics, and/or other performance metrics. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include a source server 110, six helpers 120, 122, 124, 126, 128, and 130 (helper$_1$-helper$_6$, respectively), and six proxies 150, 152, 154, 156, 158, and 160 (proxy$_1$-proxy$_6$, respectively). It is further noted that the system 100 can comprise a different amount of helpers and/or proxies, additional network components, and the like. Moreover, while components are depicted as separate components, it is noted that the components can be comprised in one or more devices, in a single device, across devices, and the like. Helpers 120, 122, 124, 126, 128, and 130, and proxies 150, 152, 154, 156, 158, and 160, can be comprise devices, such as personal computers, servers, rack servers, laptop computers, tablet computers, smart phones, personal digital assistants, and the like. The components of system 100 can communicate a data stream and/or substreams of data. It is noted that disparate substreams are depicted as a straight line and a dotted line. While two substreams are depicted, system 100 can comprise a different number of substreams.

In an aspect, the source 110 can provide content to other components. In an aspect, content can comprise video, audio, and/or other media to be transmitted, such as to an end user. The source 110 can provide content via a data stream (shown by arrows). In an aspect, the source 110 can subdivide the data stream into substreams (depicted as two substreams). It is noted that the source 110 can divide a stream into any number of substreams.

Proxies 150, 152, 154, 156, 158, and 160 (proxy$_1$-proxy$_6$, respectively), can receive all substreams. In an aspect, the proxies 150, 152, 154, 156, 158, and 160 can receive all substreams from other proxies, helpers, and/or the source 110. In an aspect, system 100 can determine delays and bandwidths at each proxy 150, 152, 154, 156, 158, and 160. In an another aspect, the source 110 can determine delays, throughputs, bandwidths, and/or other performance metrics. It is noted that various components can determine delays and/or bandwidths. For example, proxy$_1$ 150 can determine delays and/or bandwidths within a delivery path. In another aspect, components can communicate the determined delays and/or bandwidths to a disparate node (e.g., the source 110).

In implementations, the source 110 can determine what helpers 120, 122, 124, 126, 128, and 130 are needed as a function of performance metrics. For example, the source 110 can determine that helper$_5$ 128 and helper$_6$ 130 are not needed (e.g., performance metrics meet a performance criterion without helper$_5$ 128 and helper$_6$ 130). In another aspect, the source 110 can determine helper$_1$-helper$_4$ (120-126) are needed (e.g., performance metrics reach target levels with helpers). For example, the source 110 can determine if introduction and utilization of a helper will alter delay, bandwidth, and/or other metrics. In an aspect, the source 110 can further determine a substream for a helper to receive and/or transmit. As an example, the source 110 can determine that helper$_1$ 120 should receive both substreams and transmit a first substream (solid line) to proxy$_4$ 156 while transmitting the first and second substream to proxy$_1$ 150. In another example, helper$_3$ 124 only receives/transmits one substream.

Helpers 120, 122, 124, 126, 128, and 130, can act as intermediate nodes. It is noted that helpers 120, 122, 124, 126, 128, and 130 can be selected to receive all substreams, at least one substream, or no substreams. It is also noted that helpers can transmit substreams to other helpers and/or proxies. For example, helper₁ 120 can receive both substreams and transmit the substreams to proxy₁ 150. Whereas helper₂ 122, helper₃ 124, and helper₄ 126 can receive one substream and transmit the substream.

It is noted that the system 100 can utilize any number of communication frameworks and/or protocols. As an example, the system 100 can utilize a user datagram protocol (UDP), a transmission control protocol (TCP), hypertext transfer protocol (HTTP), HTTP/TCP, and the like. In an aspect, TCP may be more reliable and equipped with natural loss recovery mechanisms. This effectively minimizes unintended random loss that can seriously affects video quality. It is noted that TCP can result in easier firewall acceptance, and is much more friendly to cross-platform client programs.

Figure 2:
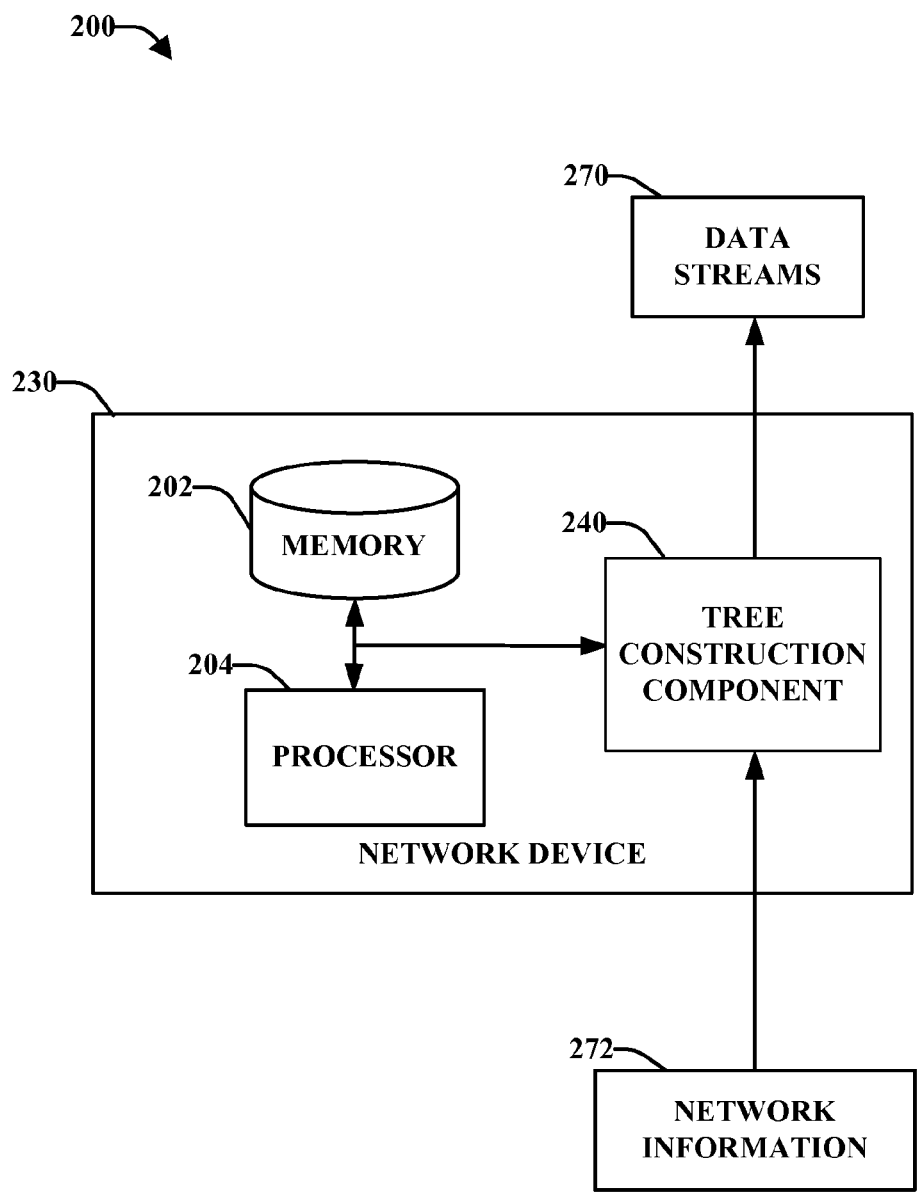
FIG. 2 illustrates a functional block diagram of a system for generation of a content delivery tree including tree construction component in accordance with various embodiments.

Turning to FIG. 2, presented is a system 200 that can facilitate generation of content delivery trees (e.g., data representing content delivery trees). In an aspect, various systems and methods disclosed herein can utilize the system 200. System 200 can include a network device 230 that can comprise memory 202 for storing computer executable components and instructions. A processor 204 can facilitate operation of the computer executable components and instructions by the system 200. System 200 can further comprise a tree construction component 240 that can generate a content distribution tree. It is further noted that the system 200 can comprise one or more client devices, server devices, and/or network applications. Moreover, while components are depicted as separate components, it is noted that the components can be comprised in one or more devices, in a single device, across devices, and the like. The network device 230 can be comprised in larger devices, such as personal computers, servers, laptop computers, tablet computers, smart phones, personal digital assistants, and the like. In another aspect, the network device 230 can transmit one or more data streams (e.g., substreams) 270 and receive network information 272. In an aspect, system 200 can construct a communication network, such as system 100. It is noted that the communication network can be defined as a set of relationships between nodes (e.g., parents, children, what nodes transmit selected substreams, what nodes receive selected substreams, etc.).

In an implementation, the tree construction component 240 can generate a directed graph that can be considered a content delivery tree, represented herein as G=(V, E), where V is a set of vertices containing overlay nodes of servers, helpers, and a streaming source. Herein, S represents a streaming source, H represents a set of helpers, and P represents a set of servers. V can be represented as V={S}∪P∪H. A set of possible overlay connections between nodes in V is represented as E=V×V. For every edge in E, ⟨i, j⟩ ∈E, there is a propagation delay d ($d_{ij}^p$ from node i to j). In an aspect, a bandwidth of a network can be normalized to a unit equal to a streaming rate of a substream, denoted as $b_s$. In an aspect, the network device can determine and/or receive the bandwidth. In an aspect, s can refer to a number of substreams 270. A streaming rate of the normalized unit can be denoted as s∈Z⁺. Each substream 270 can be delivered to each server in P by a spanning tree. In another aspect, a total of s delivery trees can be generated. Herein, a spanning tree of a $k^{th}$ substream is denoted as $T_k$.

In another aspect, every node i in V can have an uplink bandwidth denoted $U_i$ units, where $U_i$∈Z⁺, which represents the maximum number of children nodes that can be served in all spanning trees. In an aspect, an end-to-end throughput of edge ⟨i, j⟩ is denoted as $w_{ij}$∈Z⁺, which is a maximum number of substreams that can be accommodated in edge ⟨i, j⟩. It is noted that any node in V with an aggregate stream of s units from its parents is referred to herein as fully served. For example, if a node i is fully served, it streams from all s spanning trees and can stream content (e.g., video). It is noted that S has an uplink bandwidth of $U_s$ and has no parent.

In an aspect, for every node i∈P, an incidence matrix A=[$\alpha_{ik}$] indicating whether node i is on tree k is defined, e.g.:

$$a_{ik} = \begin{cases} 1, & \text{if } i \in T_k; \\ 0, & \text{otherwise.} \end{cases} \quad (1)$$

For example, node i is fully served if $\alpha_{i1}=\alpha_{i2}=\ldots=\alpha_{ik}=1$. In another aspect, the network device 230 can determine if an uplink bandwidth is larger than a total streaming bandwidth. For example, $$\sum_{i \in V} U_i \geq (|V|-1) \times s \quad (2)$$

where, "1" represents the source, which does not need to be supplied a substream. In another aspect, the tree construction component 240 can determine if a aggregate incoming bandwidth of each node is larger than the streaming rate, i.e., $$\sum_{\forall i \in V} \min(w_{ij}, U_i) \geq s, \forall j \in P. \quad (3)$$

In an aspect, the maximum throughput between two nodes is min($w_{ij}$, $U_i$), which can be bound by the minimum of edge an edge bandwidth of node i and a core bandwidth of edge ⟨i, j⟩. In another aspect, the tree construction component 240 can determine the worst-case scheduling delay from node j to node i, denoted as $d_{ji}^s$, e.g.:

$$d_{ij}^s = \sum_{k \in C(j)} \frac{L}{\min(w_{jk}, U_j) b_s / t_{jk}}, \quad (4)$$

Where L is a segment size (e.g., bits) used in streaming, C(j) is a set of children of node j in all spanning trees, and $t_{jk}$ is a number of concurrent substreams on edge ⟨j,k⟩.

The tree construction component 240 can determine a source-to-end delay of node i in a spanning tree $T_k$ as $D_i^k$, which equals a delay of its parent j in tree $T_k$ plus the propagation delay and scheduling delay between j and i, i.e., $$D_i^k = D_j^k d_{ji}^p + d_{ji}^s. \quad (5)$$

It is noted that a total delay, $D_i$, of node i can be represented by its maximum source-to-end delay $D_i^k$ among all spanning trees, i.e., $$D_i = \max_{k \in [1,s]} D_i^k. \quad (6)$$

In an implementation, the tree construction component can determine a minimum-delay streaming with helpers, such as an overlay tree that minimizes, or substantially minimizes, a maximum of a server delay, denoted as $$\min_{i \in P} \max D_i, \quad (7)$$

as a function of a streaming rate requirement (e.g., performance metric). For example, all servers receive an aggregate incoming stream of s units, i.e., $A=[\alpha_{ik}]=1, \forall i \in S$. It is noted that determining the minimum-delay streaming with helpers is NP-hard, as the minimum-delay streaming with helpers is in P, and the maximum delay of a given streaming cloud can be determined in polynomial time. Given the graph G(V, E) and its corresponding optimal delay, the tree construction component 240 can determine if a constructed overlay is an optimal and/or near optimal overlay, (e.g., delay is minimized).

For example, the travelling salesperson problem (TSP) is a common problem where each node of a set of nodes must be visited at least once. The goal is to determine the shortest path needed to visit each node. Let G'(V', E') be a graph of a TSP instance. The tree construction component 240 can transform G'(V', E') to G"(V", E") by adding a vertex $S_{end}$ and edged from all vertices to $S_{end}$. It is noted that vertices in V" represent proxy servers and a weight on each edge is the propagation delay plus a transmission time of a segment between two adjacent servers. For simplicity of explanation, considering a case where the streaming rate is 1 unit of a substream, uplink bandwidth of each peer is 1 unit, and $S_{end}$ has zero uplink bandwidth. It is noted that a resulting overlay topology must be a chain starting at S and ending at $S_{end}$. $D_{max}$ is equal to a delay of $S_{end}$, which is the sum of all delays preceding $S_{end}$. Accordingly, the tree construction component 240 can determine that $D_{max}$ in G" is a minimum and/or a near minimum if a cost of a Hamiltonian cycle in G" is minimum.

In another aspect, the tree construction component 240 can determine which helpers in a network to include in streaming, how many and which substreams each helper receives/transmits, and which proxies each included helper transmits selected substreams to. In an aspect, the network device 230 receives network information 272, such as inter-proxy distances and bandwidths. In an aspect, the tree construction component 240 can construct s delivery trees spanning all servers, through iterations. In each iteration, the tree construction component 240 adds one server into one partially constructed delivery tree. After s delivery trees are constructed, helpers are added to the trees as a function of delays (e.g., to reduce delay times). In another aspect, helpers are only added and are only assigned substreams based on reducing delay times, improving performance metrics, and/or increasing bandwidth.

In an implementation, the tree construction component 240 can initiate a tree containing only a streaming source (e.g., S, source 110, etc.). The tree construction component can calculate a potential delay of a node i that is not in tree $T_k$, where the potential delay is a delay resulting from adding i to the tree $T_k$, as:

$$\hat{D}_i^k = \min_{\forall j \in T_k} D_i^k(j), \quad (8)$$

where $D_i^k(j)$ represents a delay of node i in tree k if it connects to node j as its parent. It is noted that $d_{ij}=d_{ij}^s+d_{ij}^p$. As above, each edge $\langle i, j \rangle \in E$ can have a maximum transmission rate $w_{ij}$, which is the value that a total number of substreams from i to j cannot exceed. The tree connection component 240 can determine a residual bandwidth from i to j as $r_{ij}$, where $t_{ij}$ denotes existing traffic, in number of substreams from i to j, where:

$$r_{ij}=w_{ij}-t_{ij}. \quad (9)$$

In another aspect, the tree construction component 240 can determine if a link between two nodes, such as proxy servers, meets a threshold throughput to support a substream. If the link does not at least meet the threshold, the tree construction component 240 can introduce a helper into the path between the nodes. In an aspect, the helper can bypass a bottleneck in a network. As an example, $D_i^k(j)$ can be determined as:

$$D_i^k(j) = \begin{cases} D_j^k + d_{ji} & \text{if } r_{ji} < 0 \\ \min_{\forall h \in H, r_{jh} > 0, r_{hi} > 0} (D_j^k + d_{jh} + d_{hi}) & \text{otherwise.} \end{cases} \quad (10)$$

The tree construction component 240 can select the node i to connect to the corresponding tree $T_k$ as a function of a connection measurement, such as potential delay. For example, the tree construction component 240 can select node i as the node with the lowest potential delay, i.e., $$\arg_{\{i,k\}} \left( \min_{\forall i \notin T_k, \forall k} \hat{D}_i^k \right). \quad (11)$$

The tree construction component 240 can iterate adding nodes to corresponding trees until every server is connected to all delivery trees.

Figure 3:
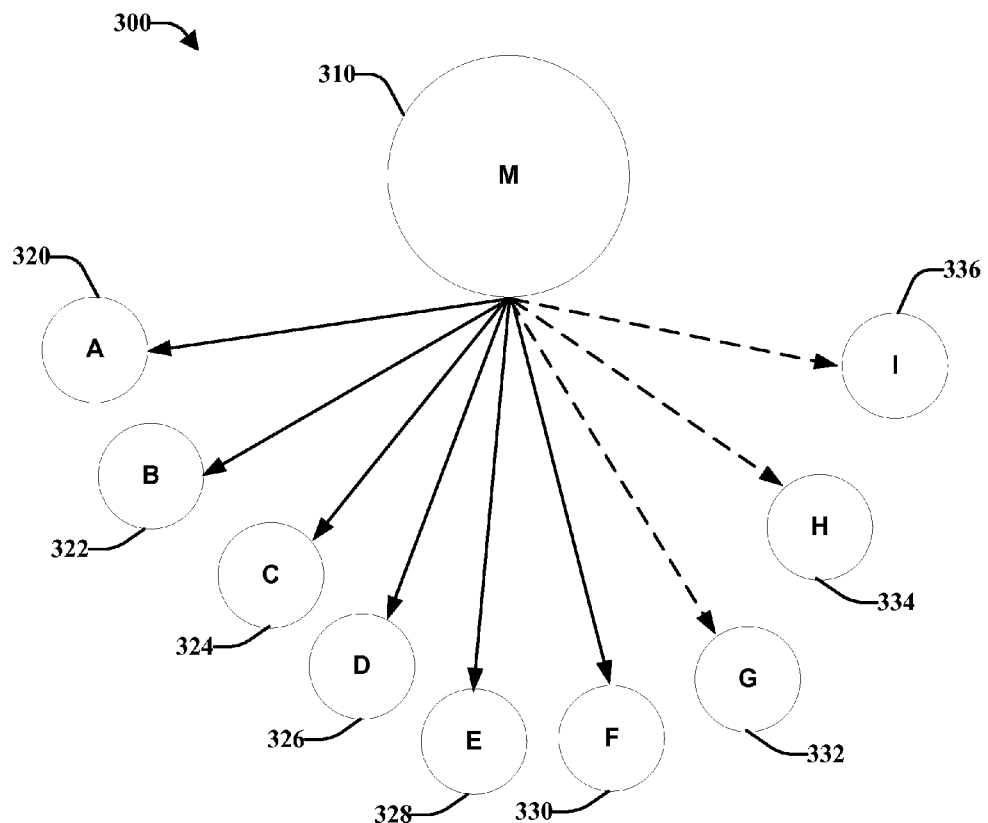
FIG. 3 illustrates a functional block diagram of a system for content deliver including a streaming source in accordance with various embodiments.
Figure 4:
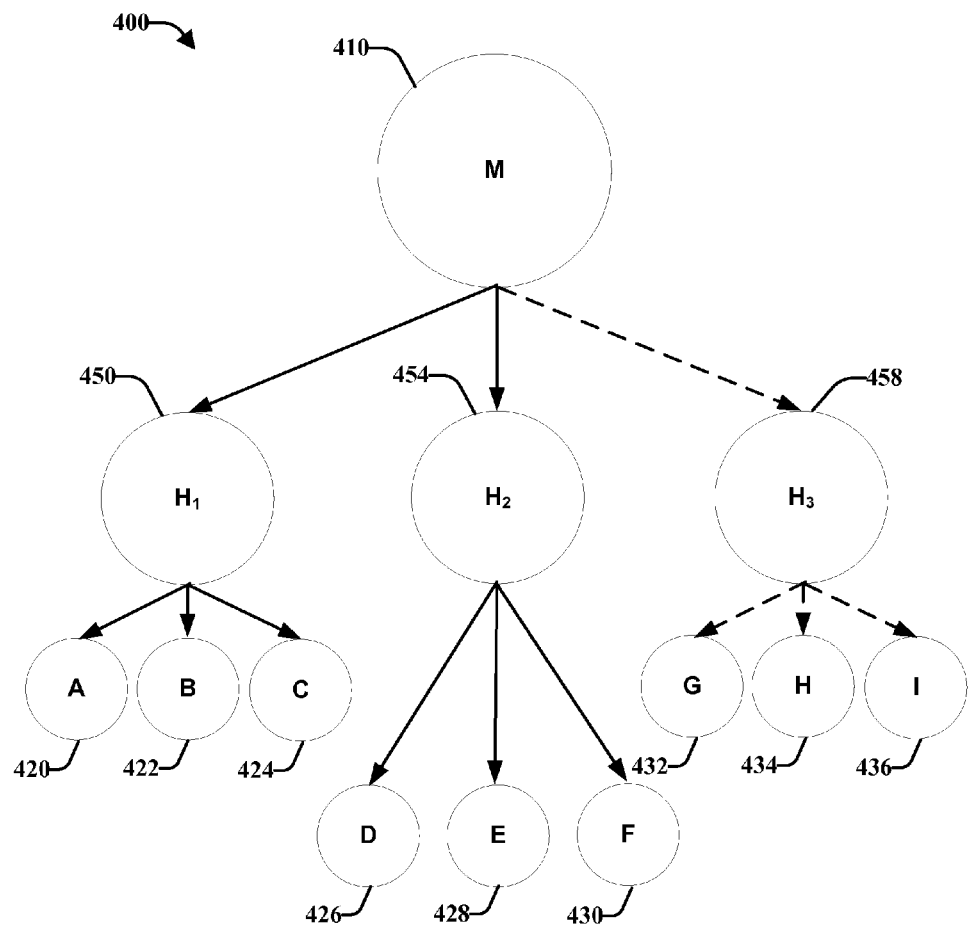
FIG. 4 illustrates a functional block diagram of a system for content deliver including helper nodes in accordance with various embodiments.

Referring now to FIG. 3 and FIG. 4, presented is system 300 before an offload process and system 400 after an offload process. For example, system 200 can construct system 300 and add helpers $H_1$ 450, $H_2$ 454, and $H_3$ 458 to construct system 400.

In an implementation, system 300 can comprise six children nodes, node A 320, node B 322, node C 324, node D 326, node E 328, and node F 330 in a delivery tree $T_1$ (represented as solid lines). In another aspect, system 300 can also comprise three children nodes, node G 332, node H 334, and node 1336 in a second delivery tree (denoted as $T_2$). It is noted that all children nodes in system 300 have a worst-case scheduling delay.

In an aspect, a tree construction component (e.g., the tree construction component 240) can determine that helpers will increase performance of trees $T_1$ and $T_2$. Accordingly, helpers can be added to the trees based on bandwidth and/or delay requirements. As an example, helpers $H_1$ 450, $H_2$ 454, and $H_3$ 458 are depicted in system 400. It is noted that the helpers $H_1$ 450, $H_2$ 454, and $H_3$ 458 can reduce scheduling delay of the nodes. In one aspect, a tree construction component (e.g., the tree construction component 240) can iterate through every node (e.g., proxy) and determine if addition of helpers will be beneficial to performance. As an example, resulting trees can comprise a source server M 410 that transmits substreams to $H_1$ 450, $H_2$ 454, and $H_3$ 458. $H_1$ 450 can transmit a substream to node A 420, node B 422, node C 424. $H_2$ 454 can transmit a substream to node D 426, node E 428, and node F 430. $H_3$ 458 can transmit a substream to node G 432, node H 434, and node 1436.

Figure 5:
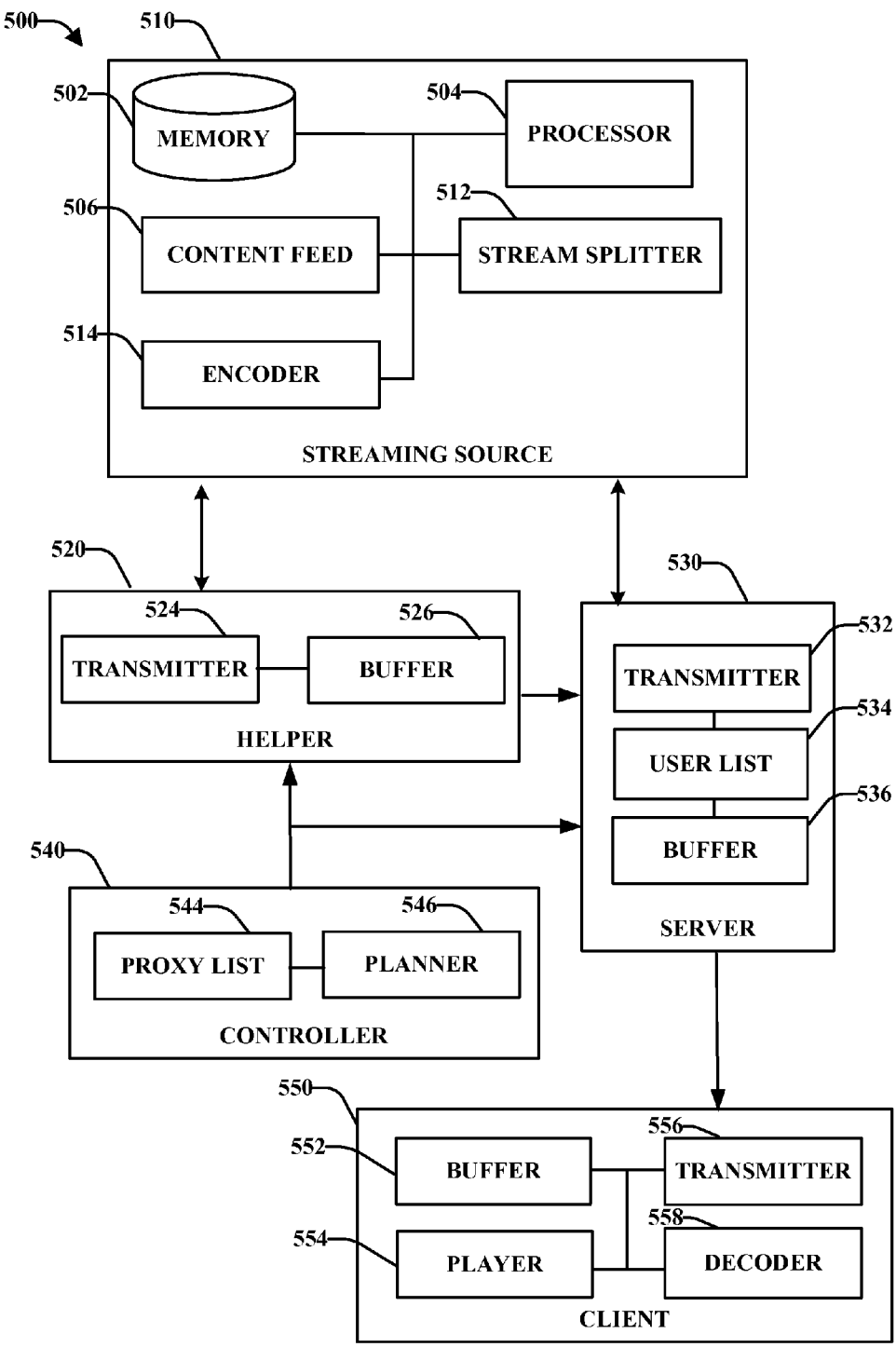
FIG. 5 illustrates a functional block diagram of a system for content deliver including a controller in accordance with various embodiments.

Turning to FIG. 5, presented is a system 500 that can facilitate generation of a content delivery overlay. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 500 can include a streaming source 410 that can comprise memory 502 for storing computer executable components and instructions, a processor 504 can facilitate operation of the computer executable components and instructions. The streaming source can further comprise a content feed component 506, a stream splitter component 512, and an encoding component 514. System 500 can further comprise a helper 520 that can offload network traffic, a server 530, an overlay controller component 540, and a client 550. It is further noted that the system 500 can comprise one or more clients, servers, network applications, and/or helpers. Moreover, while components are depicted as separate components, it is noted that the components can be comprised in one or more devices, in a single device, across devices, and the like. In another aspect, the helper 520, the server 530, the overlay controller component 540, and the client 550 can be comprised in larger devices, such as personal computers, servers, laptop computers, tablet computers, smart phones, personal digital assistants, and the like.

In an aspect, the content feed component 506 can comprise a content capturing and/or generating device, such as a camera, a microphone, a computer, and the like. The content feed component 506 can supply a streaming feed of media (such as a video stream).

In another aspect, the encoder component 514 can encode a content feed. For example, the encoder component 514 can generate a compressed signal through entropy encoding, lossy encoding, lossless encoding, modulation, and the like. It is noted that the encoder component 514 can utilize a variety of encoding techniques and/or formats. In an example, content can be encoded into video formats.

In implementations, the stream splitter component 512 can split a content feed into one or more substreams. In an aspect, the stream splitter component 512 can determine a number of substreams to split the content into as a function of user demand for the content, size of the content (bits), type of content, composition of the content, characteristics of the content, and the like. For example, the stream splitter component 512 can determine to split a feed of a high motion video into a different number of substreams than a feed of a low motion video. It is noted that the stream splitter component 512 can split content into streams before, during, and/or after encoding by the encoder component 514. In another aspect, the stream splitter component 512 can broadcast the streams to one or more the helper 520, the server 530, and/or the client 550.

In an aspect, the controller component 540 can comprise a proxy list component 544 and a planner component 546 (e.g., a tree construction component). The proxy list component 544 can comprise a list of proxy servers (both servers and helpers). It is noted that the list of proxies can comprise a stack, queue, tree, table, and the like.

In another aspect, the planner component 546 can function similar to the tree construction component 240 of FIG. 2. For example, the planner component 546 can generate an overlay by generating and/or organizing substream delivery trees. The planner component 546 can determine if the helper 520 should be included in a content delivery tree and/or what substreams the helper 520 should receive/transmit. In another aspect, the planner component 546 can add a server to a content delivery tree. For example, when a new proxy joins and/or requests to join the content delivery system, the planner component 546 can determine where the proxy gets substreams from and where the proxy forwards substreams. In another aspect, the proxy list 544 can be maintained by adding and/or deleting proxies/helpers as they enter/leave a content delivery system. It is noted that the controller 540 can be comprised in any number of larger devices such as the streaming source 510, the helper 520, the server 530, the client 550, and/or other devices.

The helper 520 can comprise a transmitter 524 and a buffer 526 that stores parts of a data stream as the data stream is received and/or awaits sending. In an aspect, the helper 520 can function similar to helpers 450, 454, 458, 120, 122, 124, 126, and the like. In an aspect, the helper 520 can transmit data based on a push-based strategy, a pull-based strategy, a data driven strategy, and/or the like. For example, in a purely push-based strategy, the helper 520 can transmit data via the transmitter 524 as it arrives. In the push-based strategy, the helper 520 does not need to exchange buffermaps, wait for a full chunk of a packet, and the like, rather the helper 520 immediately pushes (transmits) packets to children (the server 530 in this example) nodes as the packet is received. It is noted that the transmitter 524 can function as a receiver/transmitter for receiving a data stream and/or substreams from the streaming source 510.

The server 530 (e.g., a proxy server) can comprise a transmitter 532, a user list component 534, and a buffer 536. In an aspect, the buffer 536 can store a data stream and/or bits of a data stream as it awaits forwarding, downloading, and the like. In another aspect, the transmitter 532 can send/receive a data stream to/from a plurality of devices. Moreover, the user list component 534 can comprise a list of users/clients (children nodes) that the server 530 is to transmit data streams too. It is noted that the server 530 can transmit data streams based on a push-based strategy, a pull-based strategy, a data driven strategy, and/or the like. For example, in a purely push-based strategy, the server 530 can transmit data via the transmitter 532 as the data arrives. In the push-based strategy, the server 530 does not need to exchange buffermaps, wait for a full chunks of a packet, and the like, rather the server 530 can immediately push (transmits) packets to children (the client 550 in this example) nodes as the packet is received.

According to one or more implementations, the client 550 can comprise any number of end user devices. The end user devices can comprise, for example, a personal computer, a set top box, an internet enabled television, a smart phone, a personal digital assistant, a laptop computer, and the like. In an aspect, the client 550 can comprise a buffer 552, a player 554, a transmitter 556, and a decoder 558. The transmitter 556 can send/receive a data stream to/from a plurality of devices. The decoder 558 can decode data streams/substreams. In another aspect, the buffer 552 can store received data streams and/or decoded data streams awaiting playback. The player 554 can comprise a content display, such as a video player, a television screen, a liquid crystal display, and the like.

Figure 6:
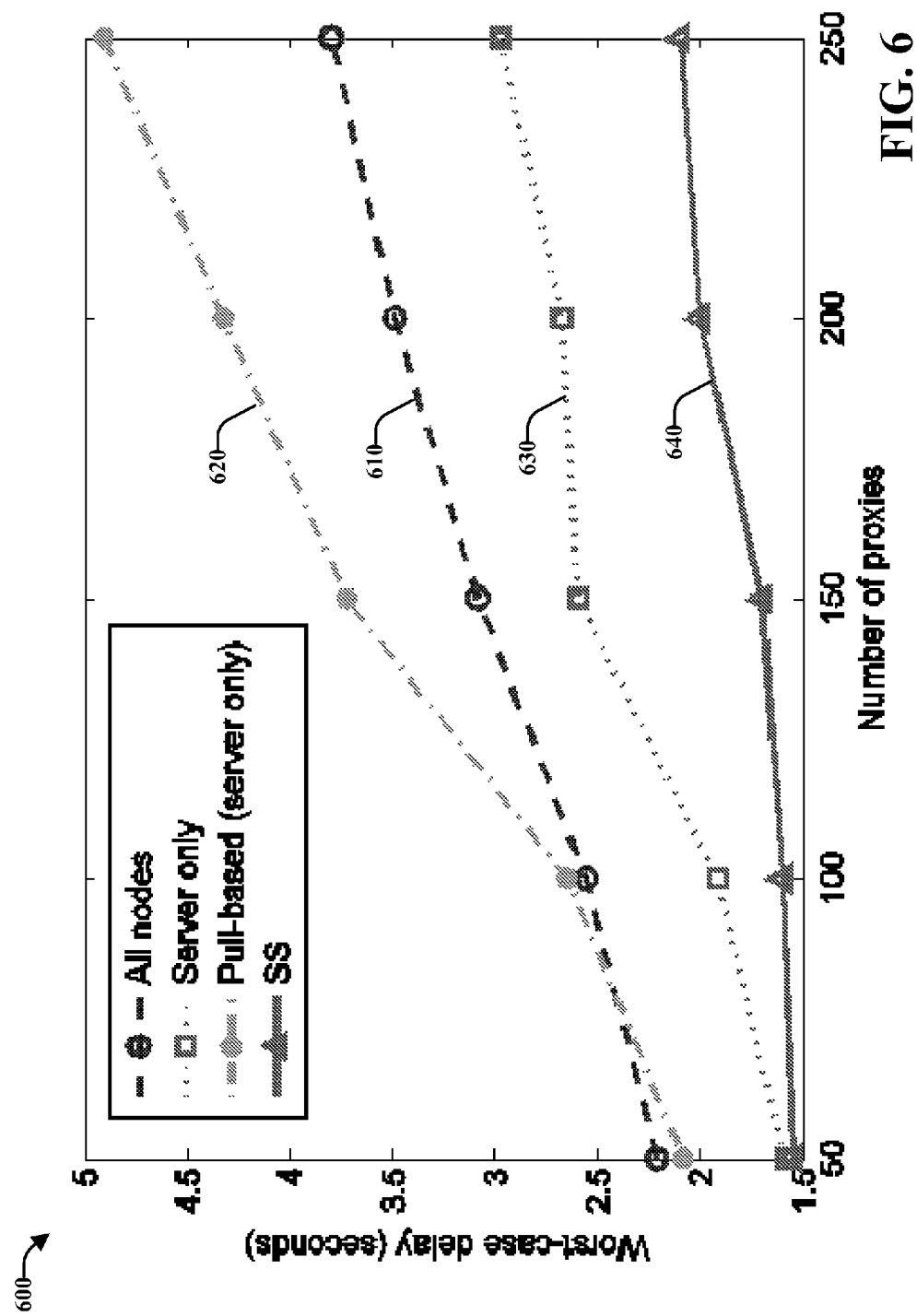
FIG. 6 illustrates a graph comparing various content delivery systems in accordance with various embodiments.

Referring now to FIG. 6, presented is a graph 600 comparing different content delivery systems based on a number proxies and a worst-case delay. Graph 600 compares an "all nodes" content delivery system (line 610), a "pull-based" only content delivery system (line 620), a "server only" content delivery system (line 630), and a content delivery system based on an implementation of this disclosure (line 640).

In an aspect, an all nodes content delivery system is based on all nodes of a system receiving and transmitting a full stream of content. The server only system does not employ helpers, rather solely relies on servers. The pull-based system involves servers that periodically exchange buffermaps and randomly pull available segments from neighboring servers to reassemble a full stream. As shown, line 640 provides improved performance (reduced worst-case delay) in comparison to lines 610, 620, and 630.

Figure 7:
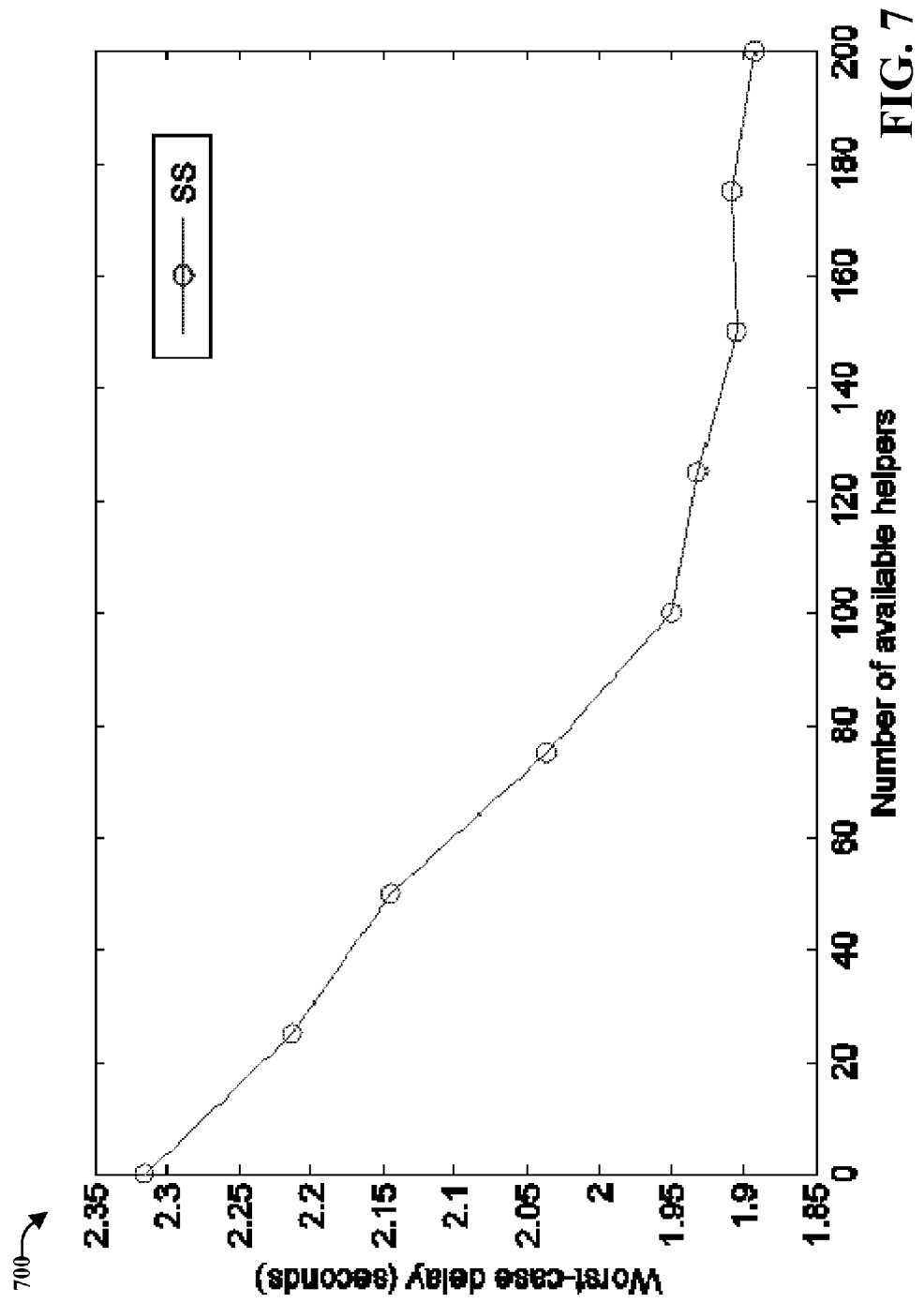
FIG. 7 illustrates a graph demonstrating a relationship between a delay and a number of helpers in accordance with an embodiment.

Referring now to FIG. 7, presented is a graph 700 of a worst-case delay versus a number of helpers. It is noted that various implementations can produce graph 700. In an aspect, a number of servers were set to 100 for graph 700. It is noted that as the number of helpers increases, the worst-case delay decreases. In an aspect, as the number of helpers increases there is more space to reduce delay. In another aspect, the marginal benefit of adding helpers decreases as more helpers are introduced in a system. Various implementations can determine a target number of helpers to introduce in a contend delivery system as a function of a worst-case delay.

Figure 8:
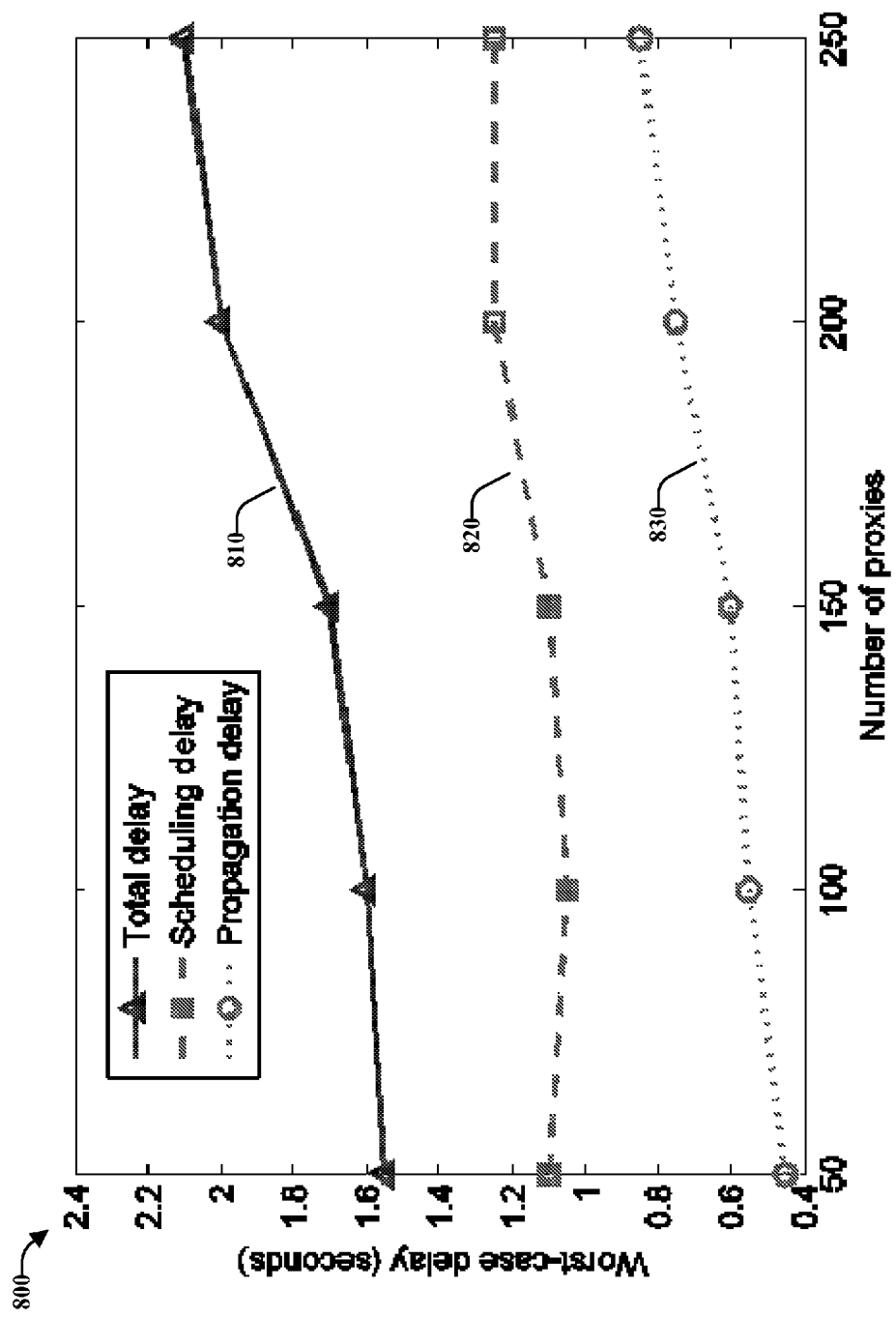
FIG. 8 illustrates a graph of delay times in accordance with an embodiment.

Referring now to FIG. 8, presented is a graph 800 showing components of scheduling and propagation delays in the worst-case delay for a content delivery system in accordance with various aspects of this disclosure. Graph 800 depicts a total delay 810, a scheduling delay 820, and a propagation delay 830 in comparison with a worst-case delay versus a number of proxies. It is noted that scheduling delay 820 represents the majority of the total delay 810, while propagation delay 830 represents a smaller portion of the total delay 810.

In some systems, the scheduling delay 820 increases at a much higher rate than propagation delay 830, compared to embodiments of this disclosure. This is because whenever a proxy serves a new child, such increase in scheduling delay affects all of its existing descendants in all substream trees. Graph 800 depicts both the scheduling delay 820 and the propagation delay 830 increasing at a lesser rate than past systems.

Figure 9:
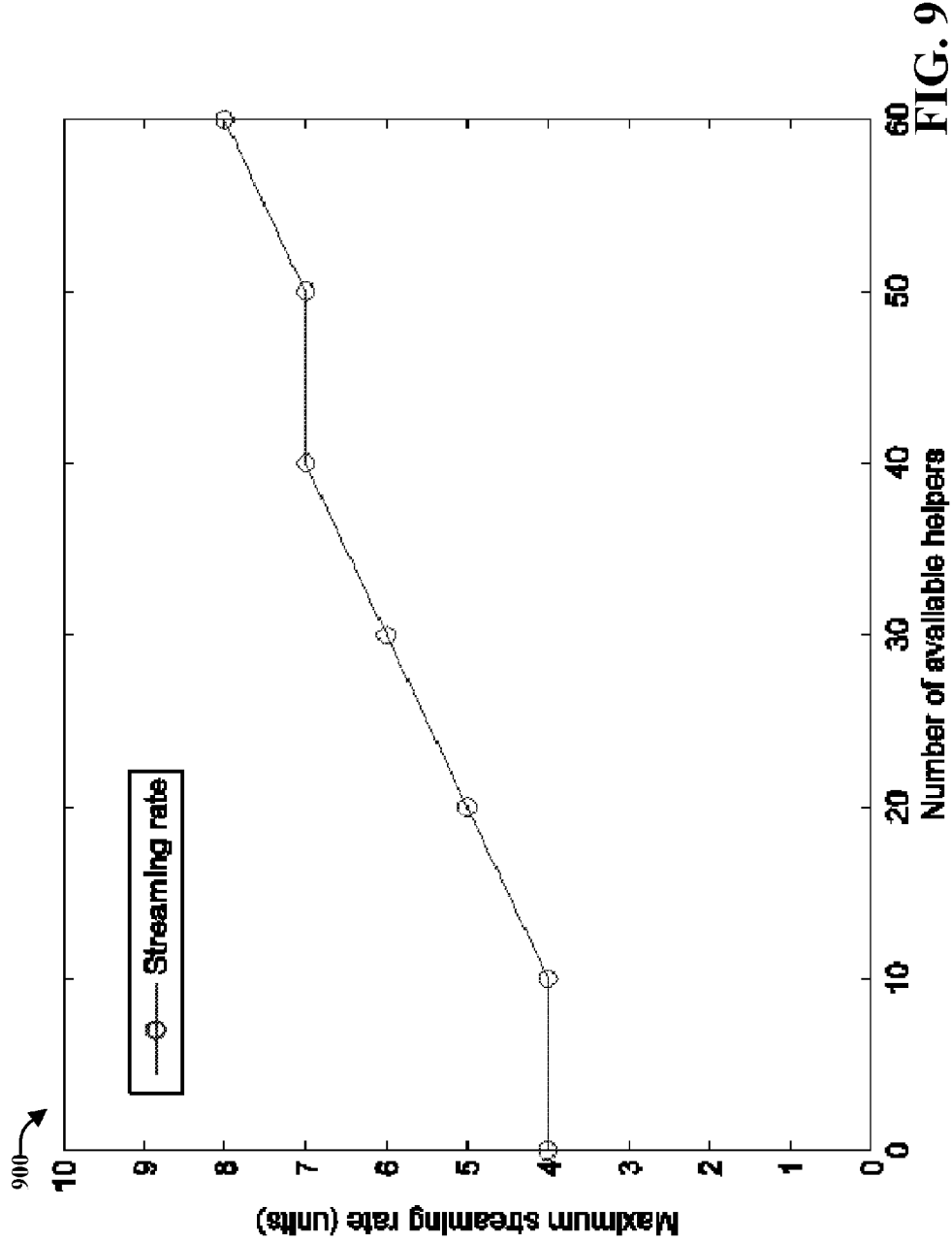
FIG. 9 illustrates a graph comparing a maximum streaming rate versus a number of helpers in a network in accordance with an embodiment.

Referring now to FIG. 9, presented is a graph 900 of a maximum stream rate versus a number of available helpers in accordance with aspects of this disclosure. It is noted that a test system used to generate the graph 900 comprised a total number of servers and helpers of 100. It is noted that as the number of available helpers increases the maximum streaming rate of a system increases. In one aspect, various embodiments of this disclosure provide an increased total bandwidth, capacity, and a richer set of alternate paths between nodes. In another aspect, a rich path diversity (e.g., greater number of available paths from one node to another) can result in aggregation of bandwidth along multiple paths in order to at least overcome bottlenecks of end-to-end connection.

Figure 10:
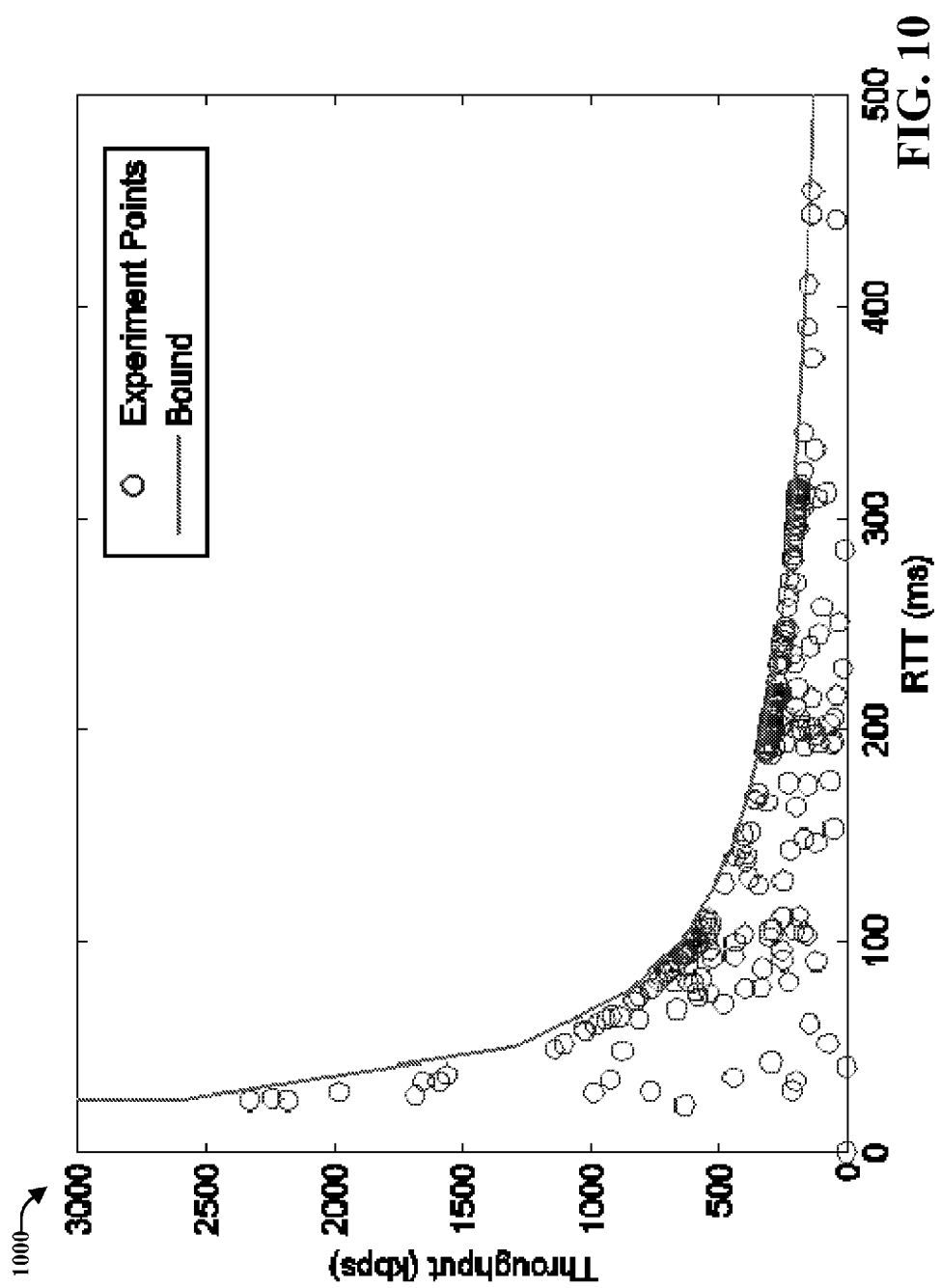
FIG. 10 illustrates a linear graph demonstrating a relationship between a throughput versus a round trip delay time accordance with an embodiment.
Figure 11:
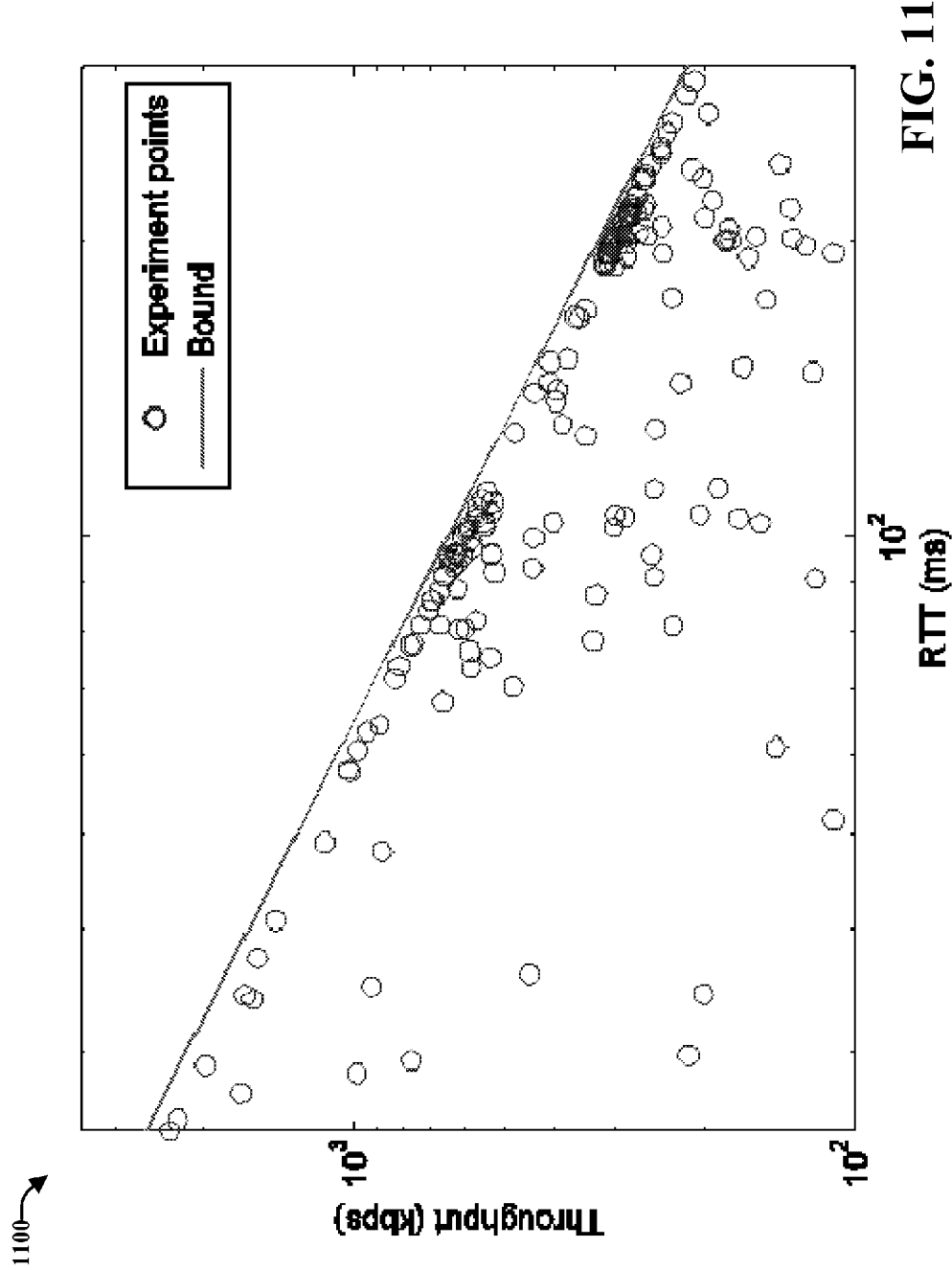
FIG. 11 illustrates a logarithmic graph demonstrating a relationship between a throughput verses a round trip delay time accordance with an embodiment.

Referring now to FIG. 10 and FIG. 11, presented are a graph 1000 and a graph 1100 showing a correlation between round trip delay time (RTT) and average end-to-end throughput. Graph 1000 depicts a linear scale and graph 1100 depicts a logarithmic scale. A continuous bond line shows the inverse relationship between throughput and RTT. It is noted that graphs 1000 and 1100 depict a single long-haul connection (e.g., Hong Kong, China to New Jersey). Various embodiments disclosed herein can introduce helpers to a content delivery system and thereby provide increase in end-to-end throughput and decreases to RTT times.

In view of the example system(s) and apparatuses described above, example method(s) that can be implemented in accordance with the disclosed subject matter are further illustrated with reference to flowcharts of FIGS. 12-15. For purposes of simplicity of explanation, example methods disclosed herein are presented and described as a series of acts; however, it is noted that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described.

Figure 12:
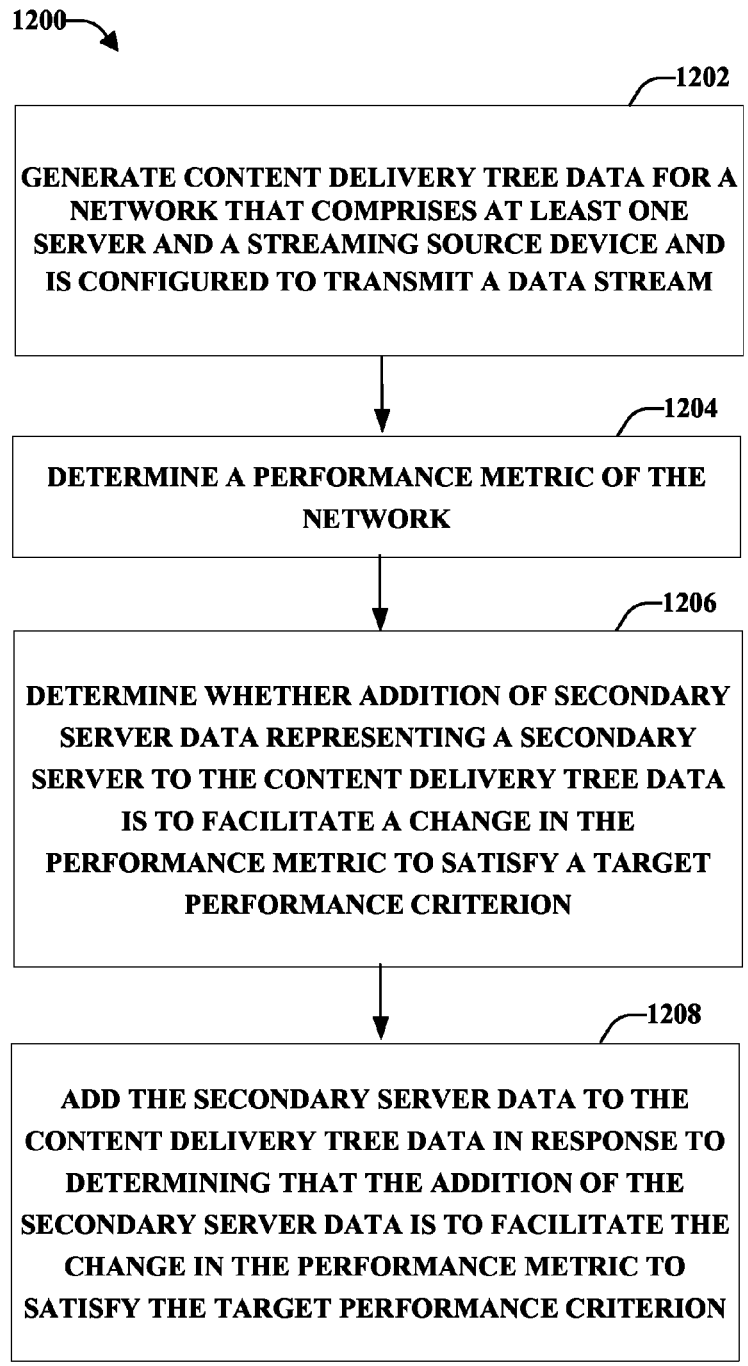
FIG. 12 illustrates a flow diagram of a method for generating a content delivery overlay in accordance with an embodiment.

Turning to FIG. 12, with reference to FIGS. 1-5, there illustrated is an exemplary method 1200 to construct a content delivery system. In an aspect, method 1200 can generate the content delivery system as an overlay on existing frameworks (e.g., via system 100, 200, 300, 400, etc.). It is noted that efficiency(ies) of method 1200 results from using various aspects of this disclosure.

At 1202, a system can generate content delivery tree data for a network that comprises at least one server and a streaming source device and is configured to transmit a data stream. In an aspect, the content delivery tree data can comprise data defining relationships between nodes of the delivery tree. For example, the data can comprise a list of active nodes, a directional graph indicating transmission paths, and the like.

At 1204, the system can determine a performance metric of the network. In an aspect, a performance metric can comprise delay times (e.g., edge-to-edge, RTT, scheduling, etc.), a bandwidth (e.g., of a system, a particular path in a system, associated with a particular substream, of a portion of a system, etc,), a number of children nodes for particular parent nodes, a throughput, etc. It is noted that the data can be collected and/or received by various components within a network (e.g., source servers, proxy servers, controllers, helpers, etc.).

At 1206, the system can determine whether addition of secondary server data representing a secondary server to the content delivery tree data is to facilitate a change in the performance metric to satisfy a target performance criterion. In accordance with various aspects of this disclosure, a system can add data representing a helper node and measure resulting performance metrics. The system can determine if addition of a helper is likely to be beneficial and/or what substreams a helper should receive/transmit. In another aspect, the system can determine not to add a helper if the helper is not likely to facilitate the performance metric meeting a target performance criterion.

At 1208, the system can add the secondary server data to the content delivery tree data in response to determining that the addition of the secondary server data is to facilitate the change in the performance metric to satisfy the target performance criterion. In an aspect, the system can add a secondary server (e.g., a helper) to a delivery tree overlay, such that the secondary server receives at least one substream of the data stream and transmits the at least one substream to one or more servers.

Figure 13:
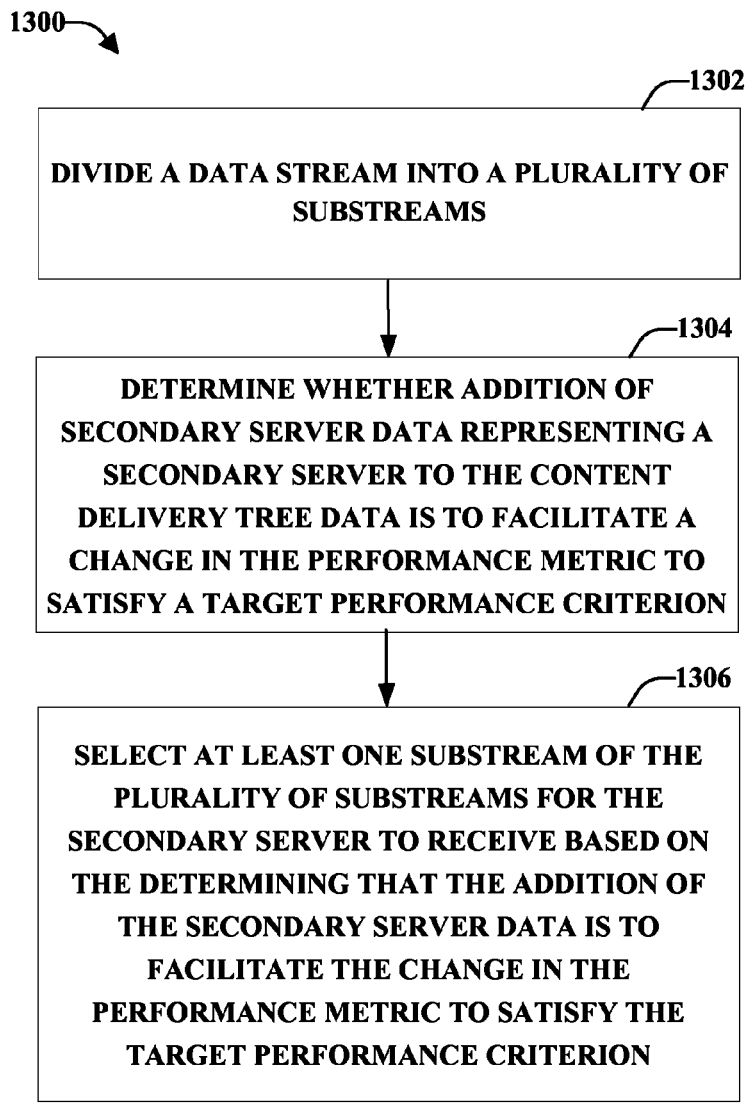
FIG. 13 illustrates a flow diagram of a method for generating a content delivery overlay including adding a secondary node that receives and transmits substreams in accordance with an embodiment.

Referring now to FIG. 13, there illustrated is an exemplary method 1300 to generate a content delivery system overlay to distribute substreams of a data stream. In an aspect, method 1300 can generate the content delivery system overlay via one or more systems (e.g., system 100, 200, 300, 400, etc.). It is noted that efficiency(ies) of method 1300 results from using various aspects of this disclosure.

At 1302, a system can divide a data stream into a plurality of substreams. According to various aspects disclosed herein, the data stream can be split into a number of substreams. The substreams can comprise portions of the data stream.

At 1304, a system can determine whether addition of secondary server data representing a secondary server to the content delivery tree data is to facilitate a change in the performance metric to satisfy a target performance criterion. As an example, a system can determine if addition of the secondary server will reduce a delay time for delivery/scheduling of a substream.

At 1306, a system can select at least one substream of the plurality of substreams for the secondary server to receive based on the determining that the addition of the secondary server data is to facilitate the change in the performance metric to satisfy the target performance criterion. It is noted that the system can determine if a bottleneck has occurred and can determine how to add the secondary server such that the bottleneck is reduced and/or eliminated.

Figure 14:
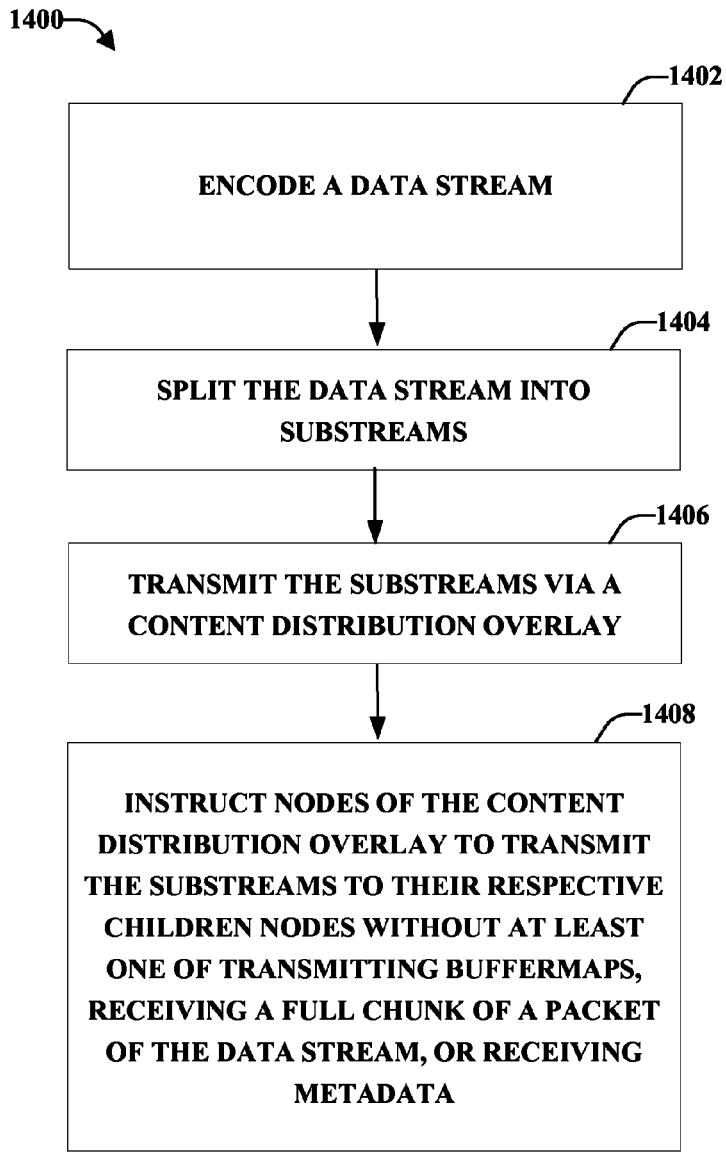
FIG. 14 illustrates a flow diagram of a method for delivering content via a content delivery overlay in accordance with an embodiment.

Turning now to FIG. 14, there illustrated is an exemplary method 1400 to generate a distribute content in a content delivery system. In an aspect, method 1400 can distribute the content via one or more systems (e.g., system 100, 200, 300, 400, etc.). It is noted that efficiency(ies) of method 1400 results from using various aspects of this disclosure.

At 1402, a system can encode a data stream. For example, a video stream can be encoded using entropy encoding and/or various encoding techniques.

At 1404, a system can split the data stream into substreams. In an aspect, the data stream can be encoded and then split or split then encoded. It is noted that the system can determine a number of substreams to split the data stream into and/or a size (bits) for the substreams.

At 1406, a system transmit the substreams via a content distribution overlay. For example, a content distribution overlay can comprise a source server, helpers, proxies, end users, and the like, in accordance with various aspects of this disclosure.

At 1408, a system can instruct nodes of the content distribution overlay to transmit the substreams to their respective children nodes without at least one of transmitting buffermaps, receiving a full chunk of a packet of the data stream, or receiving metadata. For example, the system can utilize a "push" based methodology, such that data is pushed (transmitted) to children nodes as it is received.

Figure 15:
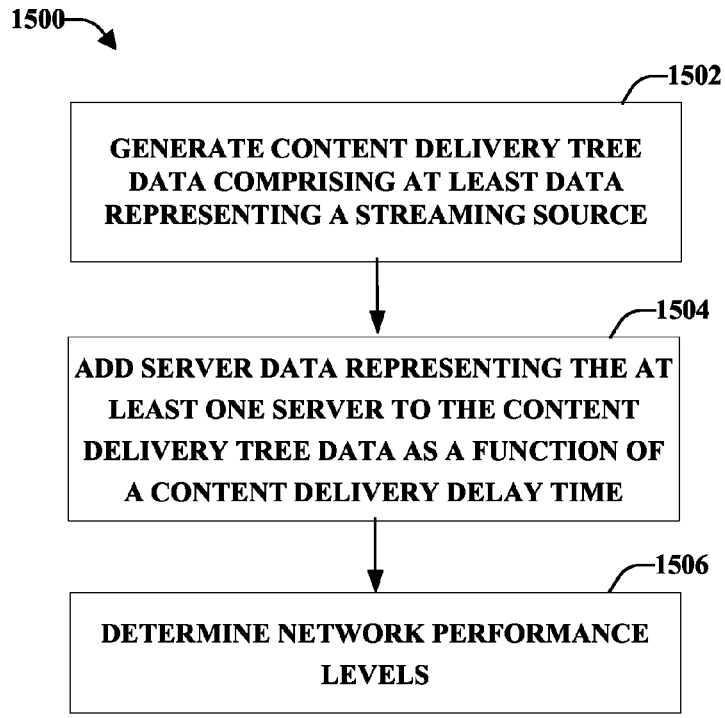
FIG. 15 illustrates a flow diagram of a method for determining content delivery paths in a content delivery overlay in accordance with an embodiment.

Turning now to FIG. 15, there illustrated is an exemplary method 1500 to generate content delivery tree data representing a content delivery overlay for a network. In an aspect, method 1500 can generate the dictionary via one or more systems (e.g., system 100, 200, 300, 400, etc.). It is noted that efficiency(ies) of method 1400 results from using various aspects of this disclosure.

At 1502, a system can generate content delivery tree data comprising data at least representing a streaming source. In an aspect, a system can construct a content delivery tree as long as a source exists.

At 1504, a system can add server data representing the at least one server to the content delivery tree data as a function of a content delivery delay time. In an aspect, a server can receive a request to access content on the source. The server can transmit the request to the source. For example, a controller can determine a server is to be added to a the content delivery tree and the controller can determine where the server should be added in the content delivery tree as a function of delay time. In an aspect, a position in a content delivery tree can be represented as relationships between nodes (e.g., parents and/or children).

At 1506, a system can determine network performance levels. In an aspect, the system can collect and/or receive data representing network performance. The system can analyze the data to determine network performance levels.

Figure 16:
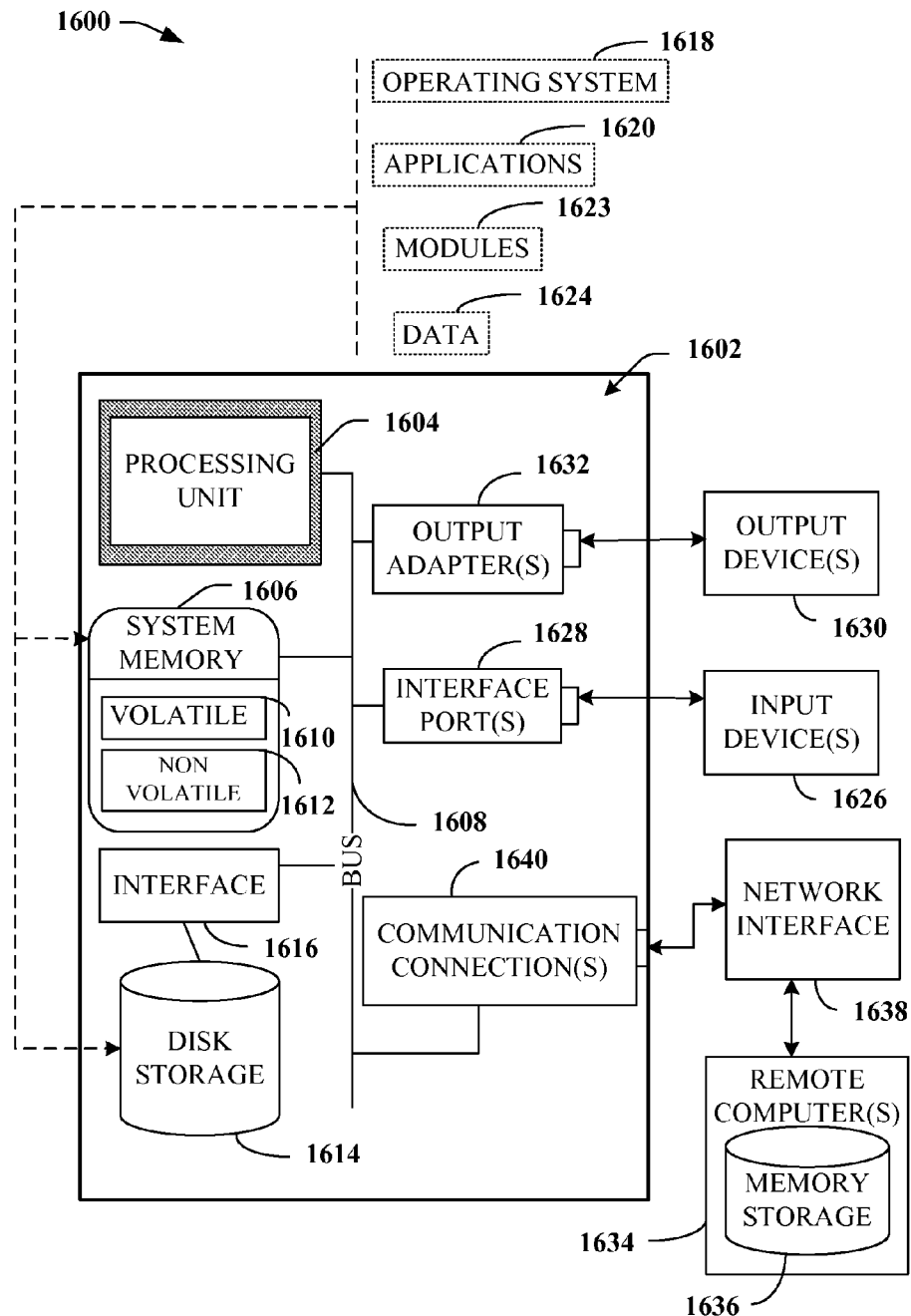
FIG. 16 illustrates a block diagram of a computing system, in accordance with an embodiment.

In order to provide a context for the various aspects of the disclosed subject matter, FIG. 16, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that performs particular tasks and/or implement particular abstract data types. For example, in memory (such as memory 202) there can be software, which can instruct a processor (such as processor 204) to perform various actions. The processor can be configured to execute the instructions in order to implement the analysis of determining assignments for data streams transmitted to one or more devices, addition of helpers, and/or improving performance metrics of a content delivery system.

Moreover, those skilled in the art will understand that the various aspects can be practiced with other computer system configurations, including single-processor or multiprocessor computer systems, mini-computing devices, mainframe computers, as well as personal computers, base stations, hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 16, a block diagram of a computing system 1600 operable to execute the disclosed systems and methods is illustrated, in accordance with an embodiment. Computer 1602 includes a processing unit 1604, a system memory 1606, and a system bus 1608. System bus 1608 couples system components including, but not limited to, system memory 1606 to processing unit 1604. Processing unit 1604 can be any of various available processors. Dual microprocessors and other multiprocessor architectures also can be employed as processing unit 1604.

System bus 1608 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (institute of electrical and electronics engineers 1194), and small computer systems interface.

System memory 1606 includes volatile memory 1610 and nonvolatile memory 1612. A basic input/output system, containing routines to transfer information between elements within computer 1602, such as during start-up, can be stored in nonvolatile memory 1612. By way of illustration, and not limitation, nonvolatile memory 1612 can include read only memory, programmable read only memory, electrically programmable read only memory, electrically erasable programmable read only memory, or flash memory. Volatile memory 1610 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1602 also includes removable/non-removable, volatile/nonvolatile computer storage media. In an implementation, provided is a non-transitory or tangible computer-readable medium storing computer-executable instructions that, in response to execution, cause a system comprising a processor to perform operations. The operations can include generating a data representing a content delivery overlay to be implement as a content delivery system as disclosed herein.

In an implementation, determining the assignments can comprise maximizing a sum of a function applied to the data streams. In another implementation, determining the assignments can comprise initializing a stream assignment policy and determining whether interference alignment is applicable to the data streams based on the stream assignment policy.

According to an implementation, the one or more devices of the multiple-input multiple-output network comprise a combination of cells, user devices, and antennas. In some implementations, the one or more devices of the multiple-input multiple-output network comprise a three or more cells.

Figure 17:
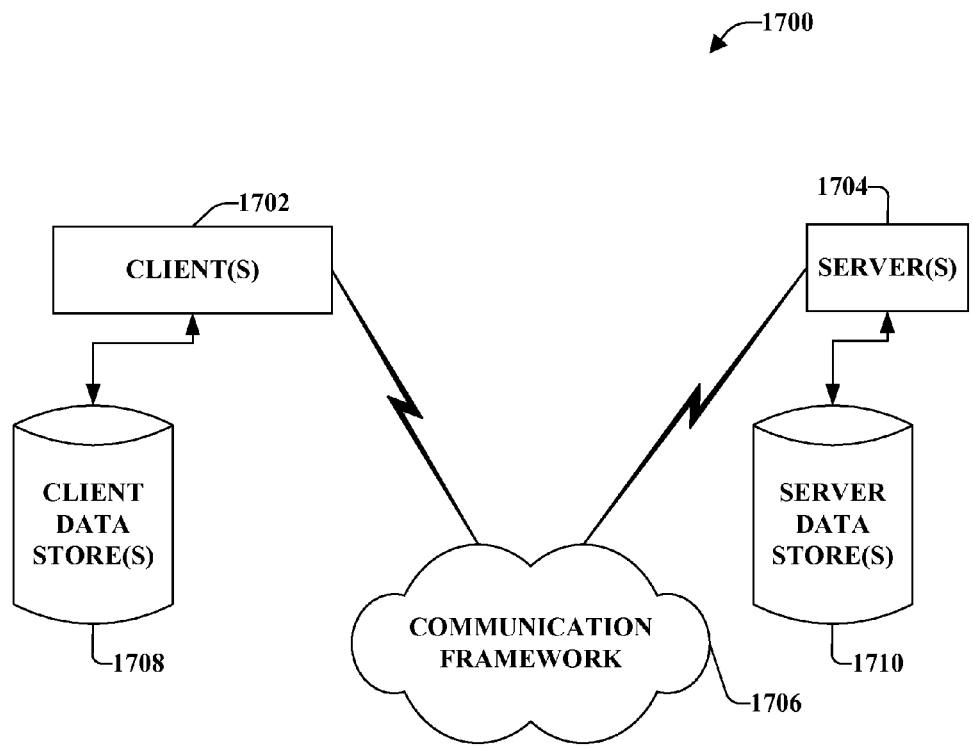
FIG. 17 illustrates a block diagram representing exemplary non-limiting networked environments in which various non-limiting embodiments described herein can be implemented.

FIG. 17 illustrates, for example, disk storage 1714. Disk storage 1714 includes, but is not limited to, devices such as a magnetic disk drive, floppy disk drive, tape drive, external drive, flash memory card, or memory stick. In addition, disk storage 1714 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1714 to system bus 1708, a removable or non-removable interface can be used, such as interface component 1716.

It is to be noted that FIG. 17 describes software that acts as an intermediary between users and computer resources described in a suitable operating environment. Such software includes an operating system 1718. Operating system 1718, which can be stored on disk storage 1714, acts to control and allocate resources of computer system 1702. System applications 1720 can take advantage of the management of resources by operating system 1718 through program modules 1722 and program data 1724 stored either in system memory 1706 or on disk storage 1714. It is to be understood that the disclosed subject matter can be implemented with various operating systems or combinations of operating systems.

A user can enter commands or information, for example through interface component 1716, into computer system 1702 through input device(s) 1726. Input devices 1726 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1704 through system bus 1708 through interface port(s) 1728. Interface port(s) 1728 include, for example, a serial port, a parallel port, a game port, and a universal serial bus. Output device(s) 1730 use some of the same type of ports as input device(s) 1726.

Thus, for example, a universal serial bus port can be used to provide input to computer 1702 and to output information from computer 1702 to an output device 1730. Output adapter 1732 is provided to illustrate that there are some output devices 1730, such as monitors, speakers, and printers, among other output devices 1730, which use special adapters. Output adapters 1732 include, by way of illustration and not limitation, video and sound cards that provide means of connection between output device 1730 and system bus 1708. It is also noted that other devices and/or systems of devices provide both input and output capabilities such as remote computer(s) 1734.

Computer 1702 can operate in a networked environment using logical connections to one or more remote computers, such as remote computer(s) 1734. Remote computer(s) 1734 can be a personal computer, a server, a router, a network computer, a workstation, a microprocessor based appliance, a peer device, or other common network node and the like, and can include many or all of the elements described relative to computer 1702.

For purposes of brevity, only one memory storage device 1736 is illustrated with remote computer(s) 1734. Remote computer(s) 1734 is logically connected to computer 1702 through a network interface 1738 and then physically connected through communication connection 1740. Network interface 1738 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks such as integrated services digital networks and variations thereon, packet switching networks, and digital subscriber lines.

Communication connection(s) 1740 refer(s) to hardware/software employed to connect network interface 1738 to system bus 1708. While communication connection 1740 is shown for illustrative clarity inside computer 1702, it can also be external to computer 1702. The hardware/software for connection to network interface 1738 can include, for example, internal and external technologies such as modems, including regular telephone grade modems, cable modems and DSL modems, ISDN adapters, and Ethernet cards.

Referring now to FIG. 17, there is illustrated a schematic block diagram of a computing environment 1700 in accordance with this specification. The system 1700 includes one or more client(s) 1702 (e.g., laptops, smart phones, PDAs, media players, computers, portable electronic devices, tablets, and the like). The client(s) 1702 can be hardware and/or software (e.g., threads, processes, computing devices). The system 1700 also includes one or more server(s) 1704. The server(s) 1404 can also be hardware or hardware in combination with software (e.g., threads, processes, computing devices). The servers 1404 can house threads to perform transformations by employing aspects of this disclosure, for example. One possible communication between a client 1702 and a server 1704 can be in the form of a data packet transmitted between two or more computer processes wherein the data packet may include video data. The data packet can include a cookie and/or associated contextual information, for example. The system 1700 includes a communication framework 1706 (e.g., a global communication network such as the Internet, or mobile network(s)) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

In one embodiment, a client 1702 can transfer an encoded file, in accordance with the disclosed subject matter, to server 1704. Server 1704 can store the file, decode the file, or transmit the file to another client 1702. It is noted, that a client 1702 can also transfer uncompressed file to a server 1704 and server 1704 can compress the file in accordance with the disclosed subject matter. Likewise, server 1704 can encode information and transmit the information via communication framework 1706 to one or more clients 1702.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the s and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2300, etc. UTRA includes Wideband-CDMA (W-CDMA) and other variants of CDMA. Further, CDMA2300 covers IS-2300, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.23, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2300 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction, and/or data. Additionally, a computer program product may include a computer readable medium having one or more instructions or codes operable to cause a computer to perform functions described herein.

Further, the actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments.

What is claimed is:

1. A system, comprising:
    a processor, communicatively coupled to a memory, that executes or facilitates execution of executable components stored in a non-transitory computer readable medium, the executable components comprising:
    a tree construction component configured to at least:
    generate tree data representing an overlay multi-tree topology corresponding to relationships between nodes of a content delivery tree, wherein the content delivery tree spans at least one server in a network and is configured to transmit a data stream, and wherein the content delivery tree comprises a set of links between the nodes;
    determine whether an addition of a helper node at a first location of the content delivery tree between a first node and a second node of the nodes is associated with a change in a performance metric that satisfies a target performance level of the content delivery tree, wherein the tree construction component is further configured to add the helper node to the content delivery tree based on a determination that the addition of the helper node is associated with satisfaction of the target performance level, and wherein the performance metric comprises at least one of a content delivery delay of the network, a bandwidth of the network, or a number of children nodes connected to the at least one server;
    determine whether a transmission of the data stream or a first set of substreams of the data stream from the first node to the helper node and whether a transmission of the data stream or a second set of substreams of the data stream from the helper node to the second node is associated with achieving a decrease in data transmission delays based on an addition of the helper node to the first location, wherein the data transmission delays comprise a transmission time, a propagation delay and a scheduling delay associated with the set of links and an increase in bandwidth along at least one path of the content delivery tree, wherein the propagation delay comprises half or about half of a round trip delay time, and wherein the scheduling delay comprises a sum of a scheduling wait time or a data transmission time associated with the nodes of the content delivery tree; and
    instruct the at least one server to transmit the first set of substreams to the first node to the helper node based on a determination that a transmission of the first set of substreams to the helper node alters the performance metric to satisfy the target performance level.

2. The system of claim 1, wherein the executable components further comprise:
    a stream splitter component configured to split the data stream into the first set of substreams and the second set of substreams.

3. The system of claim 2, wherein the tree construction component is further configured to select the data stream and assign the helper node to receive the first set of substreams in response to a determination that the addition of the helper node satisfies the target performance level.

4. The system of claim 1, wherein each server of the at least one server is associated with the helper node and the second node receiving the first set of substreams and the second set of substreams respectively of the substreams.

5. The system of claim 1, wherein the content delivery tree is a directed graph.

6. The system of claim 1, wherein the nodes of the content delivery tree are instructed to transmit a packet of the data stream based on a push-based transmission, a pull-based transmission, or a data driven transmission.

7. The system of claim 1, wherein the performance metric comprises a streaming rate requirement.

8. The system of claim 1, wherein the executable components further comprise a streaming source component configured to transmit the data stream using the tree data.

9. A method, comprising:
    generating, by a system comprising a processor, content delivery tree data that represents an overlay multi-tree topology corresponding to a content delivery route for a network that comprises a first set of servers, a set of links corresponding to the system, and a streaming source device that is configured to transmit a data stream associated with the content delivery tree data;
    determining, by the system, a performance metric of the network;
    determining, by the system, whether an addition of server data representing a second set of servers to a first location between a set of nodes and another set of nodes of the content delivery tree data facilitates a change in a first performance metric to satisfy a target performance criterion of the network, wherein the addition of server data to the content delivery tree data is based on a determination that the addition of server data is associated with satisfaction of the target performance criterion, and wherein the performance metric comprises at least one of a content delivery delay of the network, a bandwidth of the network, or a number of children nodes connected to the second set of servers;
    determining, by the system, whether a first transmission of the data stream or first substreams of the data stream to a set of helper nodes from the set of nodes and whether a second transmission of the data streams or second substreams of the data streams from the set of helper nodes to the other set of nodes is associated with a decrease in at least one of respective data transmission delays based on an addition of the second servers to the first location, wherein the data transmission delays comprise a transmission time, a propagation delay and a scheduling delay corresponding to the set of links, wherein the helper node corresponds to the second set of servers, wherein the scheduling delay comprises half or substantially half of a round trip delay time, and wherein the propagation delay comprises a sum of a scheduling wait time or a data transmission time associated with the set of nodes of the content delivery tree data; and instructing the first set of servers to transmit the first substreams of the data stream to the set of helper nodes based on a determination that a transmission of the first set of substreams to the set of helper nodes alters the performance metric to satisfy the target performance criterion.

10. The method of claim 9, further comprising adding the server data to the content delivery tree data in response to determining that the addition of the server data facilitates the change in the first performance metric to satisfy the target performance criterion.

11. The method of claim 9, further comprising dividing the data stream into the first substreams and the second substreams.

12. The method of claim 11, further comprising selecting a substream of the data stream to transmit to the second set of servers based on determining that the addition of the second set of server data facilitates the change in the first performance metric to satisfy the target performance criterion.

13. The method of claim 9, wherein the addition of the server data comprises reception of the data stream by the second set of servers and transmission of the data stream to the first set of servers.

14. The method of claim 9, further comprising instructing the first set of servers to transmit the first substreams of the data stream in response to receiving the packet.

15. The method of claim 9, further comprising streaming a video feed based on the content delivery tree data.

16. The method of claim 9, further comprising removing a first set of the server data representing the first set of servers to the content delivery tree data based on a determination that removing the first set of server data reduces content delivery delay time.

17. A system, comprising:
means for generating an overlay content delivery tree configured to transmit a data stream;
means for determining a probability of whether addition of a helper server to the content delivery tree will alter a performance of the content delivery tree;
means for adding the helper server to a first location of the content delivery tree in response to determining, based on the probability, that the addition of the helper server to the first location is likely to alter the performance of the content delivery tree to achieve a target performance level;
means for determining whether a transmission of the data stream or first substreams of the data stream to a helper node of the helper server and whether a transmission of the data stream or second substreams of the data stream from the helper server is associated with a change in threshold throughput of a set of links corresponding to the system, a decrease in data transmission delays based on an addition of the helper server to the first location, wherein the data transmission delays comprise a transmission time, a propagation delay and a scheduling delay associated with each link of the set of links, wherein a link of the set of links comprises a connection between a first node and a second node of the content delivery tree and the helper node corresponding to the helper server, wherein the propagation delay comprises half of a round trip delay time, wherein the scheduling delay comprises a sum of a scheduling wait time or a data transmission time associated with nodes of the content delivery tree, and wherein the nodes comprise the first node and the second node, wherein the addition the helper server to the content delivery tree data is based on a determination that the addition of the helper server is associated with satisfaction of the target performance level, and wherein the performance comprises at least one of a content delivery delay of the network, a bandwidth of the network, or a number of children nodes connected to the helper server;
means for determining whether the transmission of the substreams is associated with an alteration of the performance of the content delivery tree to achieve the target performance level; and
instructing the helper server to transmit the first substreams of the data stream to the helper server based on a determination that a transmission of the first substreams to the set of helper nodes alters the performance to satisfy the target performance level.

18. The system of claim 17, wherein the means for determining the probability further comprises means for determining the performance of the content delivery tree.

19. The system of claim 17, further comprising means for splitting the data stream into the first substreams and the second substreams.

20. The system of claim 19, further comprising means for determining at least one substream for the helper server to receive and transmit based on the determining that the addition of the helper server alters the performance of the content delivery tree to achieve the target performance level.

21. A computer-readable storage device comprising computer-executable instructions that, in response to execution, cause a device comprising a processor to perform operations, comprising:
generating content delivery overlay data representing an overlay multi-tree topology corresponding to a content delivery network device that is configured to deliver a data stream within a content delivery network;
determining a performance characteristic of the content delivery network device based on at least one of a transmission delay, a bandwidth, or a throughput;
splitting the data stream into substreams;
adding a secondary server to a first location of the content delivery network, that receives first substreams of the substreams and transmits second substreams of the substreams to at least one primary server, based on determining whether an addition of data representing a secondary server to the content delivery overlay data alters the performance characteristic to satisfy a threshold performance level corresponding to the performance characteristic, wherein an of the secondary server to the content delivery network is based on a determination that the addition of the secondary server is associated with satisfaction of the threshold performance level, and wherein the performance characteristic comprises at least one of a content delivery delay of the network, a bandwidth of the network, or a number of children nodes connected to the helper server;
determining whether a transmission of the second substreams to a second node from a helper node and receipt of the first substreams by the helper node of the secondary server is associated with a change in threshold throughput of a set of links corresponding to the content delivery system, a decrease in data transmission delays comprising a transmission time, or a propagation delay and a scheduling delay associated with each link of the set of links based on an addition of the secondary server to the first location, wherein a link of the set of links comprises a connection between the first node and the second node corresponding to the at least one primary server and the helper node corresponding to the secondary server, wherein the propagation delay comprises half or near half of a round trip delay time, wherein the scheduling delay comprises a sum of a scheduling wait time or a data transmission time associated with nodes of the content delivery tree, and wherein the nodes comprise the first node and the second node; and determining whether the transmission of the second substream and the receipt of the first substreams is associated with an alteration of the performance characteristic to satisfy the threshold performance level; and instructing the secondary server or the at least one primary server to transmit the first substreams to the set of nodes based on a determination that a transmission of the first substreams to the set of nodes alters the performance characteristic to satisfy the threshold performance level.

22. The computer-readable storage device of claim 21, wherein the operations further comprise determining transmission paths between a source server and the at least one primary server.

23. The computer-readable storage medium of claim 21, wherein the operations further comprise altering the content delivery overlay data based on a request for access to the data stream by another primary server different from the at least one primary server.

24. The computer-readable storage medium of claim 21, wherein the at least one primary server represents an intermediary device capable of receiving requests from another device.

* * * * *